United States Patent
Iwata et al.

(10) Patent No.: US 11,705,122 B2
(45) Date of Patent: Jul. 18, 2023

(54) INTERFACE-PROVIDING APPARATUS AND INTERFACE-PROVIDING METHOD

(71) Applicant: KABUSHIKI KAISHA TOSHIBA, Minato-ku (JP)

(72) Inventors: Kenji Iwata, Machida (JP); Hiroshi Fujimura, Yokohama (JP); Takami Yoshida, Kamakura (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 111 days.

(21) Appl. No.: 17/007,567

(22) Filed: Aug. 31, 2020

(65) Prior Publication Data

US 2021/0256972 A1    Aug. 19, 2021

(30) Foreign Application Priority Data

Feb. 18, 2020 (JP) .................... 2020-025085

(51) Int. Cl.
| | | |
|---|---|---|
| *G10L 15/22* | (2006.01) | |
| *G10L 15/26* | (2006.01) | |
| *G10L 15/08* | (2006.01) | |
| *G06F 3/16* | (2006.01) | |
| *G06N 5/025* | (2023.01) | |
| *G06F 16/332* | (2019.01) | |

(52) U.S. Cl.
CPC .............. *G10L 15/22* (2013.01); *G06F 3/167* (2013.01); *G06F 16/3329* (2019.01); *G06N 5/025* (2013.01); *G10L 15/08* (2013.01); *G10L 15/26* (2013.01); *G10L 2015/088* (2013.01)

(58) Field of Classification Search
CPC ......... G10L 15/22; G10L 15/08; G10L 15/26; G10L 2015/088; G06F 16/3329; G06F 3/167; G06N 5/025
See application file for complete search history.

(56) References Cited

U.S. PATENT DOCUMENTS

| | | | |
|---|---|---|---|
| 8,204,751 B1* | 6/2012 | Di Fabbrizio | .......... G10L 15/26 704/277 |
| 8,719,005 B1* | 5/2014 | Lee | .......... G06N 5/025 707/706 |
| 9,900,632 B1* | 2/2018 | Flores Guerra | ..... G06F 16/7867 |
| 10,559,305 B2 | 2/2020 | Komori | |
| 2010/0114944 A1* | 5/2010 | Adler | .......... G10L 13/027 707/E17.062 |

(Continued)

FOREIGN PATENT DOCUMENTS

| | | | |
|---|---|---|---|
| JP | WO 2017/191696 A1 | 11/2017 | |
| JP | 2020-123131 A | 8/2020 | |
| WO | WO 2019/202787 A1 | 10/2019 | |

*Primary Examiner* — Bhavesh M Mehta
*Assistant Examiner* — Darioush Agahi
(74) *Attorney, Agent, or Firm* — Oblon, McClelland, Maier & Neustadt, L.L.P.

(57) ABSTRACT

According to one embodiment, the interface-providing apparatus comprises an identifying unit and a generating unit. The identifying unit identifies a keyword from dialogue data including a question text to request information, and a response text in reply thereto. The generating unit generates display information to display a user interface for receiving feedback input relating to a degree of usefulness of a keyword when searching for the requested information.

13 Claims, 18 Drawing Sheets

(56) References Cited

U.S. PATENT DOCUMENTS

| | | | | |
|---|---|---|---|---|
| 2010/0121973 | A1* | 5/2010 | Lobacheva | G10L 15/183 |
| | | | | 704/235 |
| 2011/0288937 | A1* | 11/2011 | Manoogian, III | G06Q 50/01 |
| | | | | 705/14.66 |
| 2014/0351228 | A1* | 11/2014 | Yamamoto | G06F 40/35 |
| | | | | 707/723 |
| 2017/0169101 | A1* | 6/2017 | Walia | G06F 16/3329 |
| 2018/0011687 | A1* | 1/2018 | Imagawa | G10L 15/26 |
| 2018/0090133 | A1* | 3/2018 | Minemura | G10L 13/08 |
| 2020/0074990 | A1* | 3/2020 | Kim | G10L 15/06 |
| 2020/0243082 | A1 | 7/2020 | Yoshida et al. | |
| 2020/0327197 | A1* | 10/2020 | Bhowal | G06N 5/041 |
| 2021/0124879 | A1* | 4/2021 | Hashimoto | G06F 16/2423 |
| 2021/0264905 | A1* | 8/2021 | Byun | G06F 3/04883 |

* cited by examiner

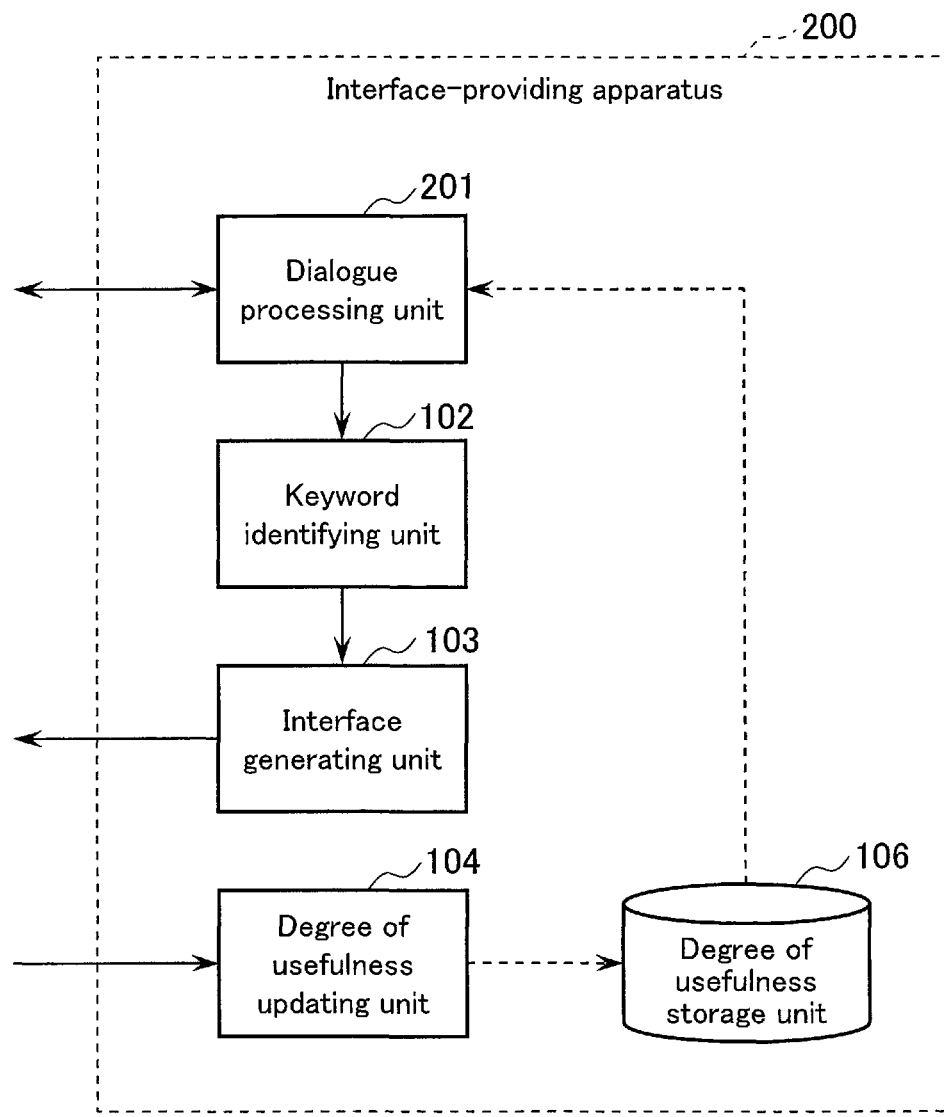
F I G. 8

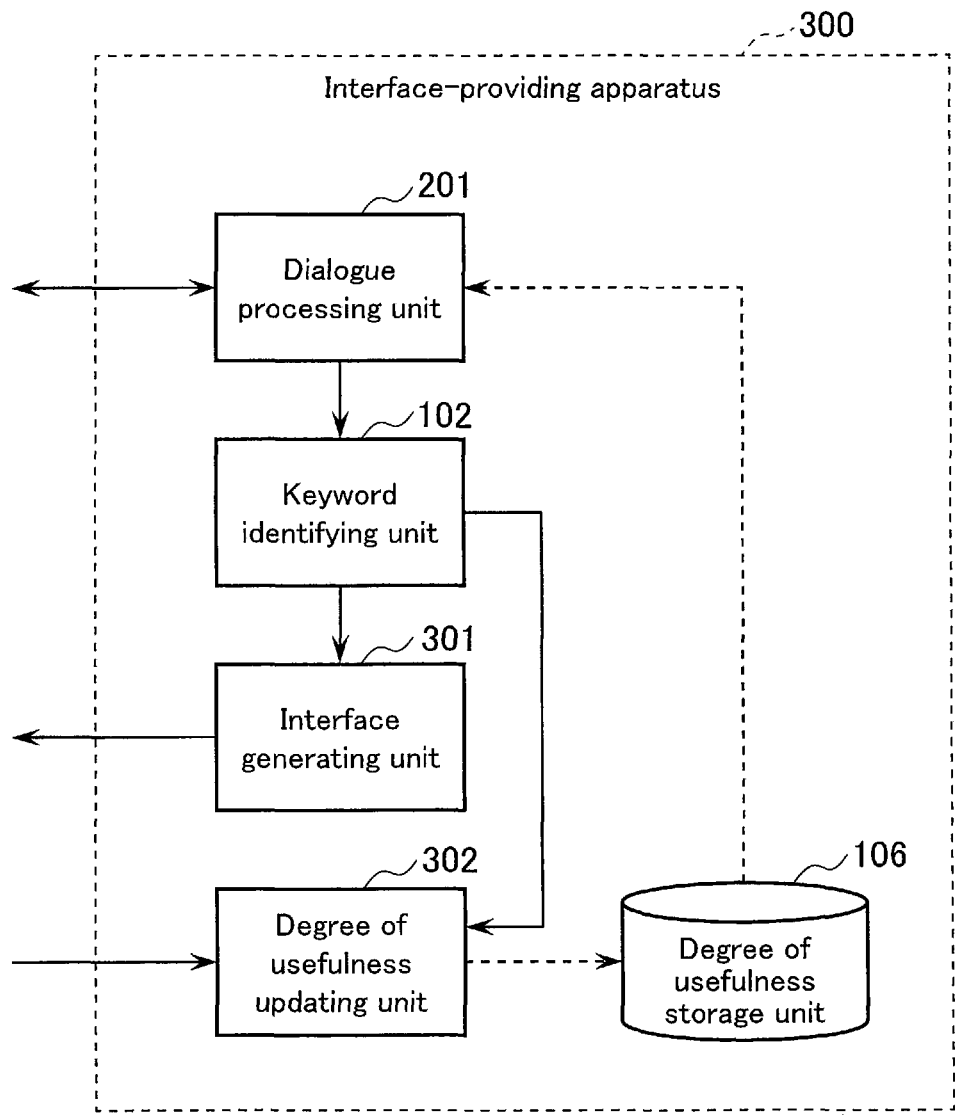
F I G. 12

INTERFACE-PROVIDING APPARATUS AND INTERFACE-PROVIDING METHOD

CROSS-REFERENCE TO RELATED APPLICATIONS

This application is based upon and claims the benefit of priority from Japanese Patent Application No. 2020-025085, filed Feb. 18, 2020, the entire contents of which are incorporated herein by reference.

FIELD

Embodiments described herein relate generally to an interface-providing apparatus and an interface-providing method.

BACKGROUND

A dialogue system in which a user and a system interact with each other by audio or text is known. The dialogue system is capable of, for example, responding to a question from a user, or executing an operation requested by the user; therefore, is expected to be used in a variety of scenes.

The dialogue system includes a comparatively simple dialogue system that interacts with a user by a question and answer format or a command format using a command that is defined in advance. Here, in addition to the question and answer format or the command format, in a case where the dialogue system is more complicated, since there is more flexibility in the user's speech, a wider range of use may be expected.

However, in a more complex dialogue system, in some cases, questions and instructions included in the user's speech may be ambiguous or insufficient. In such case, it is necessary to make inquiries from the system to the user, which, at times, would require interactions over a number of times until information necessary for an appropriate response or for performing an appropriate operation can be obtained.

BRIEF DESCRIPTION OF THE DRAWINGS

FIG. 8 is a block diagram exemplifying a function configuration of an interface-providing apparatus according to a second embodiment.

FIG. 12 is a block diagram exemplifying a function configuration of an interface-providing apparatus according to a third embodiment.

DETAILED DESCRIPTION

According to one embodiment, the interface-providing apparatus comprises an identifying unit and a generating unit. The identifying unit identifies a keyword from dialogue data including a question text to request information, and a response text in reply thereto. The generating unit generates display information to display a user interface for receiving feedback input relating to a degree of usefulness of a keyword when searching for the requested information.

Hereinafter, various embodiments will be described with reference to the accompanying drawings.

Hereinafter, elements that are identical to or similar to already explained elements will be given identical or similar symbols as the already explained elements, and redundant explanations thereof will be basically omitted. For example, in a case where a plurality of identical or similar elements exist, common symbols may be used to provide explanations without distinguishing each element, or branching numbers may be used in addition to the common symbols to provide explanations by distinguishing each element.

The interface-providing apparatuses according to the embodiments provide user interfaces that receive feedback input for the dialogue system to make a more appropriate inquiry to the user's speech. In a dialogue system that allows higher flexibility in the user's speech, in a case where the request or the instruction from the user is ambiguous, the kind of inquiry to be made to the user becomes important. Here, in addition to making a simple inquiry on an additional condition in an inquiry text, a word (keyword) indicating an additional condition can be exemplified. Such word will be referred to as an exemplification word. Since the user's reply thereafter may change depending on the exemplification word included in the inquiry text, the exemplification word to be used in the inquiry becomes important. A feedback input via the user interface will be used for adjusting the degree of usefulness of the exemplification word to be used in the inquiry.

The interface-providing apparatuses according to the embodiments are computers, such as personal computers or smart phones, which can exchange information with the dialogue system. The interface-providing apparatuses may be a part of the dialogue system, or may contain the dialogue system. Here, the term interface includes a screen, a display, an operation, a method, or a device, etc. used for exchanging information between the user and the interface-providing apparatus, and may be referred to as a user interface or a feedback input interface.

Furthermore, here, the term "user" may include both a user (also referred to as a "general user") who uses the dialogue system, such as a client, and a user (also referred to as a "management user") who provides the dialogue system, such as a system operator or manager.

(1) First Embodiment (1-1) Configuration

Figure 1:
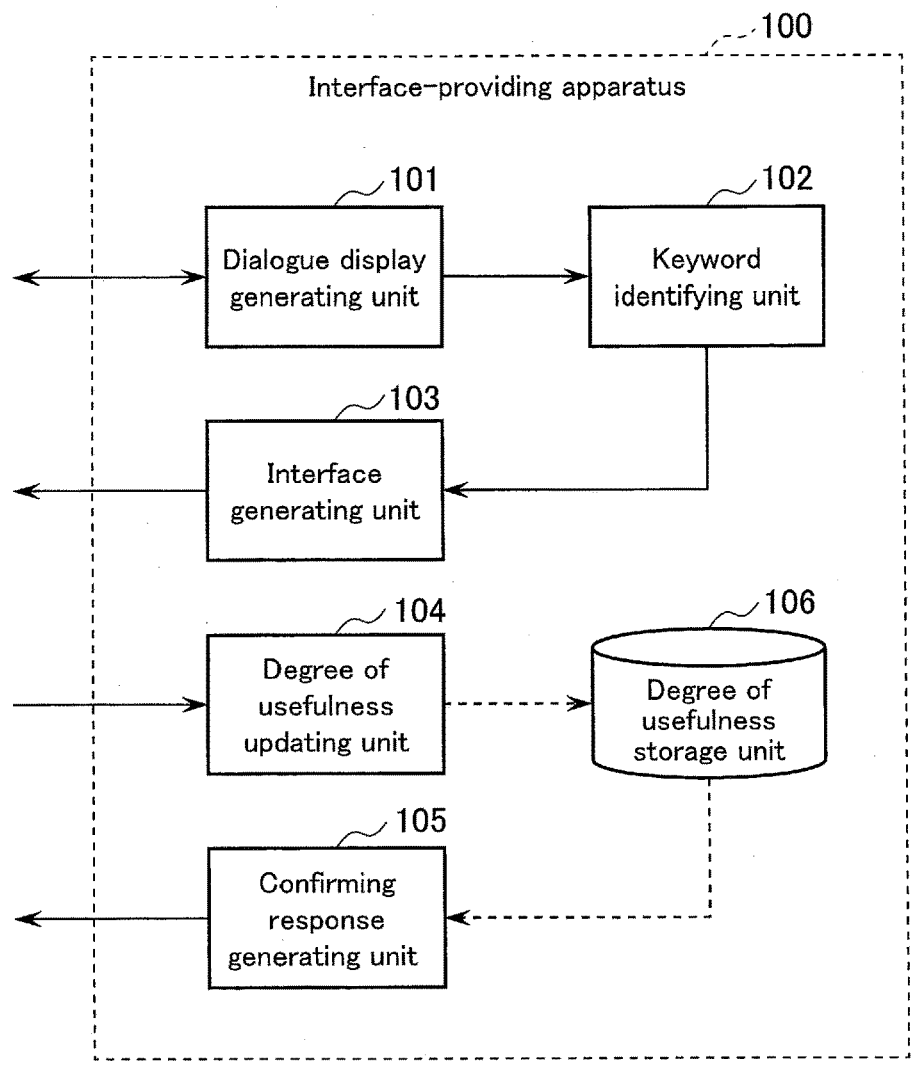
FIG. 1 is a block diagram exemplifying a function configuration of an interface-providing apparatus according to a first embodiment.

FIG. 1 is a block diagram schematically showing a function configuration of an interface-providing apparatus 100 according to a first embodiment.

The interface-providing apparatus 100 is, for example, a computer used by a system manager managing a dialogue system, and comprises a dialogue display generating unit 101, a keyword identifying unit 102, an interface generating unit 103, a degree of usefulness updating unit 104, and a confirming response generating unit 105 as processing function units. The interface-providing apparatus 100 further comprises a degree of usefulness storage unit 106.

The dialogue display generating unit 101 generates display information for displaying interactions between a user and a system. The display information generated by the dialogue display generating unit 101 may include actual interactions that are performed concurrently, or may include past interactions that are accumulated as a log. The interactions include at least a speech sentence of the user and a response sentence of the system. However, the interactions may also include a spoken voice of the user and the system in a case where the dialogue system interacts by voice, or a search result of information performed by the system in accordance with the user's request, etc. In the first embodiment, the dialogue display generating unit 101, in particular, acquires dialogue data including a text expressing a speech sentence of a user requesting information (also referred to as a "question text") and a text expressing a response sentence in reply thereto from a system (also referred to as a "response text"), and generates display information for displaying the above interactions based on the dialogue data. The response sentence may include an inquiry sentence (also referred to as an "inquiry text") for narrowing down a search target of the information requested by the user. The inquiry sentence may include an exemplification word for narrowing down the search target of the information requested by the user.

The keyword identifying unit 102 receives the user speech sentence and the system response sentence from the dialogue display generating unit 101, and identifies a keyword in these sentences. When identifying the keyword, various methods can be adopted, such as a rule-based method using a dictionary, etc. registered in advance, or a statistics-based method for identifying a keyword from an expression relating to such as "tell me about . . . ". For example, as an example of the rule-based method, a keyword may be spotted from the sentence with reference to a keyword list prepared in advance. Furthermore, when performing keyword spotting, a synonym on the keyword list may also be spotted by using a term distributed representation, etc., learned in advance. Alternatively, by statistically learning the kind of expression that is mostly used for the keyword and identifying the keyword using the learned model, etc., a method of statistically identifying the keyword may be used. As for identifying the keyword in the system response sentence, in some cases, the keyword may be known when the response sentence is generated. Therefore, such information can also be utilized. Alternatively, the keyword identifying unit 102 may use the rule-based method and the statistics-based method in combination.

The interface generating unit 103 generates a feedback input interface to receive a feedback input from a user relating to the degree of usefulness of a keyword when searching for the requested information. In coordination with the display information generated by the dialogue display generating unit 101, the interface generating unit 103 also generates display information for displaying the feedback input interface together with the above-described interactions. In the first embodiment, in particular, the interface generating unit 103 generates display information for displaying the feedback input interface in association with each of the keywords identified by the keyword identifying unit 102.

The degree of usefulness updating unit 104 calculates and updates the degree of usefulness of each keyword based on the feedback input received via the above feedback input interface. More specifically, the degree of usefulness updating unit 104 calculates the degree of usefulness of each keyword based on the feedback input, and generates or updates data indicating the degree of usefulness of keyword which correlates the calculated degree of usefulness with each keyword. The data indicating degree of usefulness of keyword is stored in the degree of usefulness storage unit 106 described later. The degree of usefulness may be updated by various methods such as a method of linearly increasing a degree of usefulness value in accordance with the number of times a good feedback is input, a method of non-linearly increasing the degree of usefulness value using a log, etc., or a method of increasing the degree of usefulness value stepwise every predetermined number of times.

The confirming response generating unit 105 generates a response text for confirming that the feedback input is reflected, and generates display information for displaying the response text. More specifically, the confirming response generating unit 105 refers to the updated data indicating degree of usefulness of keyword, generates an inquiry text using a keyword with a higher degree of usefulness as an exemplification word, and generates the display information for displaying the text. The confirming response generating unit 105 may perform the above generating processing in response to the data indicating degree of usefulness of keyword being updated by the degree of usefulness updating unit 104, or in response to input requesting to generate or display the response text for confirmation. The generated inquiry text may be a response to a condition of interaction displayed together with the interface at the time of the feedback input, or may be a response to a condition explicitly designated by a management user, etc.

The degree of usefulness storage unit 106 stores the data indicating degree of usefulness of keyword that is generated or updated by the degree of usefulness updating unit 104.

In the data indicating degree of usefulness of keyword, the degree of usefulness of each keyword may be correlated with a condition of interaction in which the keyword is used. Here, the condition of interaction includes a state of a dialogue scenario, information input by a user until then, and a search result with respect to the user's request, etc. In this manner, a plurality of degrees of usefulness corresponding to the condition of interaction are managed for a specific keyword. Alternatively, the degree of usefulness may be managed as information indicating whether or not the keyword is generally useful, which does not depend on the condition of interaction. In this case, even if the feedback input is performed under a specific condition, the degree of usefulness may be updated as a degree of usefulness relating to a specific keyword, which does not depend on the condition. The data indicating degree of usefulness of keyword may include, in relation to each keyword, both a degree of usefulness that does not depend on a condition (hereinafter, referred to as a "global degree of usefulness") and a degree of usefulness that depends on a condition (hereinafter, referred to as a "local degree of usefulness").

In the case where the dialogue system performs information search based on a current condition of interaction, the confirming response generating unit 105 may generate the inquiry sentence by using not only the data indicating degree of usefulness of keyword, but also information on how frequently a certain keyword is used in the search result, etc. Furthermore, in the case where the data indicating degree of usefulness of keyword includes both the global degree of usefulness and the local degree of usefulness, the confirming response generating unit 105 may combine both values and determine whether or not to use the keyword in the inquiry sentence.

Figure 2:
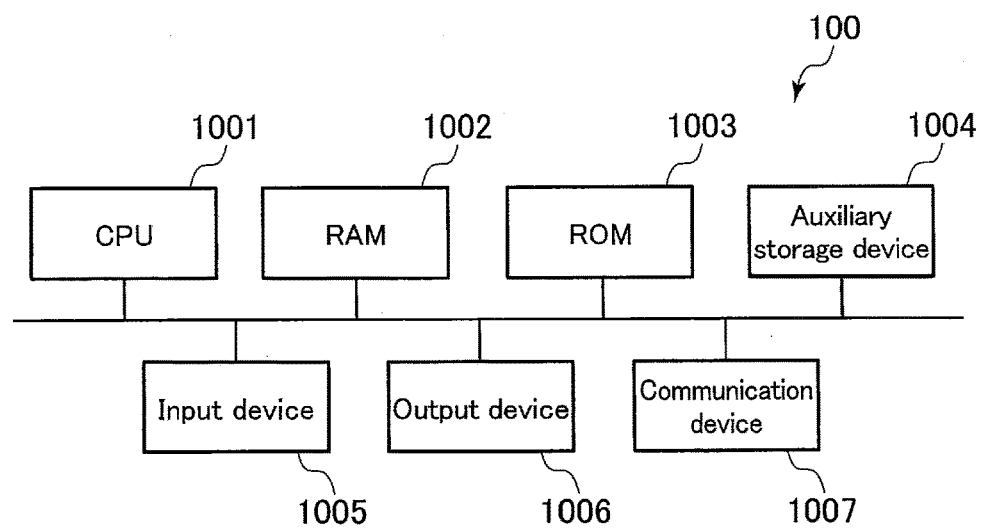
FIG. 2 is a block diagram exemplifying a hardware configuration of the interface-providing apparatus according to the first embodiment.

FIG. 2 schematically shows a hardware configuration example of the interface-providing apparatus 100 according to the first embodiment. As shown in FIG. 2, the interface-providing apparatus 100 comprises a central processing unit (CPU) 1001, a random access memory (RAM) 1002, a read only memory (ROM) 1003, an auxiliary storage device 1004, an input device 1005, an output device 1006, and a communication device 1007.

The processing functions of the interface-providing apparatus 100 mentioned above are realized by the CPU 1001 developing a program stored in the ROM 1003 or the auxiliary storage device 1004 on the RAM 1002 and executing this program. The CPU 1001 is an example of a hardware processor. The hardware processor is not limited to a general-purpose processor such as the CPU 1001, and may be an exclusive processor such as an application specific integrated circuit (ASIC) or a field-programmable gate array (FPGA).

The auxiliary storage device 1004 comprises a computer-readable storage medium that stores data in a non-volatile manner, and may be, for example, a hard disk drive (HDD) or a solid state drive (SDD). The auxiliary storage device 1004 operates as a storage unit including the degree of usefulness storage unit 106.

The input device 1005 comprises, for example, a keyboard, a mouse, a joystick, and a microphone. The output device 1006 comprises, for example, a display device such as a liquid crystal display or an organic EL display, and a speaker. The input device 1005 and the output device 1006 may be, for example, an integral-type touch panel device that is a combination of a display device such as a liquid crystal panel and an input device such as a touch panel.

The communication device 1007 performs wireless or wired communication with respect to an external device. The communication device 1007 comprises, for example, a local area network (LAN) port, and is connected to a communication network using, for example, a LAN cable to receive and transmit data from and to the external device via the communication network. The communication device 1007 may comprise a wireless module, such as a wireless LAN or a Bluetooth (registered trademark) module. The communication device 1007 may also include an external interface, such as a USB port.

Hereinafter, the first embodiment will be explained by a situation in which the interface-providing apparatus 100, in particular, reads a dialogue log between a general user and a system as dialogue data, identifies a keyword included in the dialogue data, and provides a feedback input interface that receives feedback input from a management user relating to a degree of usefulness of each keyword. Display information generated by the interface-providing apparatus 100 is, for example, output to a display serving as the output device 1006, converted into a display screen including the feedback input interface, and is displayed for the management user. The management user can perform feedback input to indicate whether or not the keyword was appropriate by, for example, performing a click operation with a mouse serving as the input device 1005 with respect to the displayed feedback input interface. However, the situation is not limited to the above, and the interface-providing apparatus 100 may use dialogue data between the management user and the system, or the feedback input interface may receive input from a general user. Furthermore, the display screen may be displayed on other devices that can communicate with the interface-providing apparatus 100.

(1-2) Operation

An operation of the interface-providing apparatus 100 according to the first embodiment will be explained.

Figure 3:
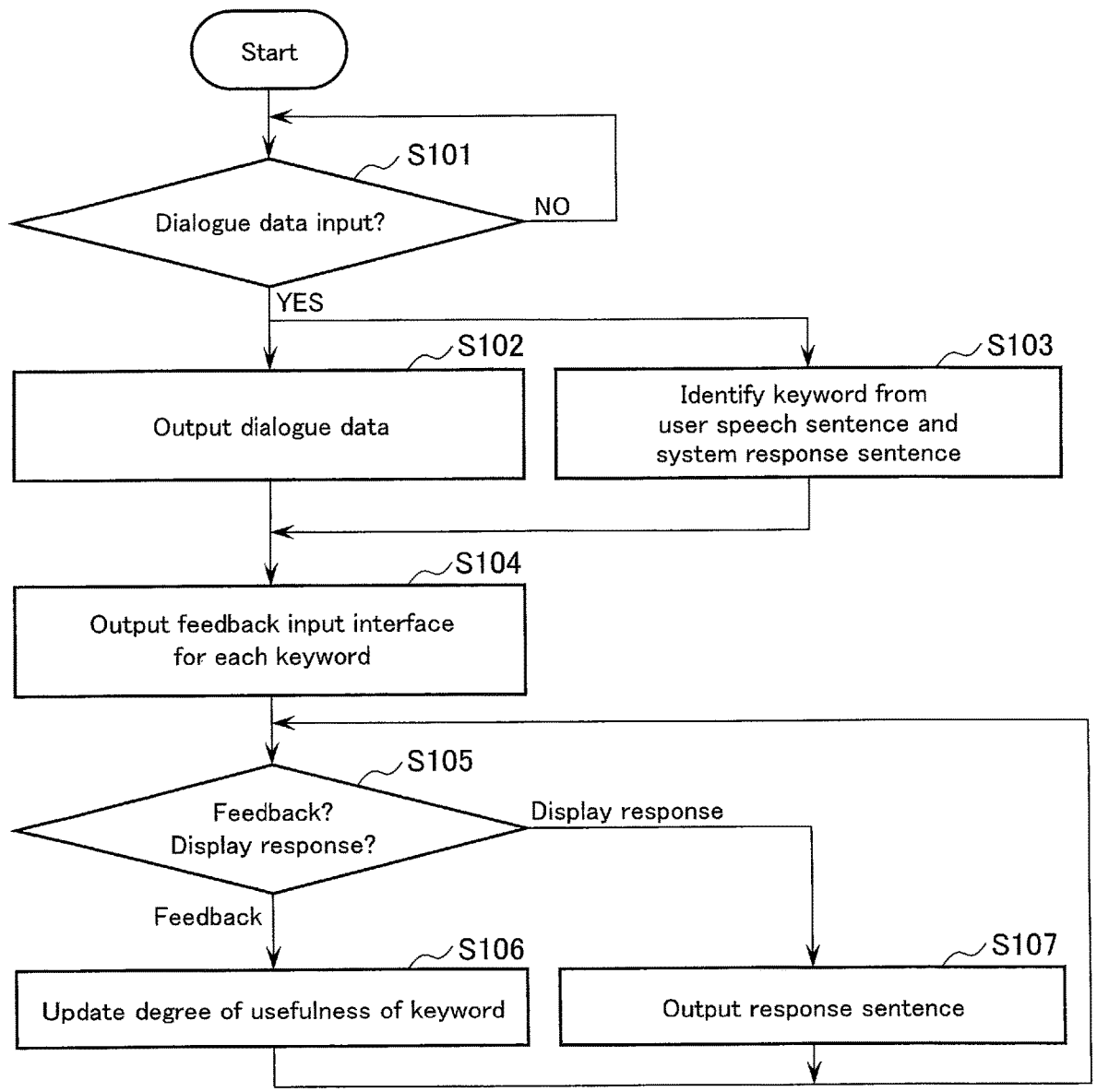
FIG. 3 is a flowchart showing a first example of a processing operation performed by the interface-providing apparatus according to the first embodiment.

FIG. 3 is a flowchart schematically showing a first example of a processing operation of the interface-providing apparatus 100. As shown in FIG. 3, in step S101, first, the interface-providing apparatus 100 waits for dialogue data to be input. The dialogue data may be input by any method. For example, the dialogue data may be imported into the interface-providing apparatus 100 from an external storage medium such as a USB, or may be read from a database server, etc. on a network. When the dialogue data is input (step S101: YES), the processing proceeds to a subsequent step.

In step S102, by the dialogue display generating unit 101, the interface-providing apparatus 100 generates and outputs display information for displaying interactions for the management user based on the received dialogue data. The display information is received by, for example, the output device 1006, is converted into a display screen, and is displayed.

Furthermore, in step S103, by the keyword identifying unit 102, the interface-providing apparatus 100 identifies a keyword from a user speech sentence and a system response sentence included in the received dialogue data. It should be noted that steps S102 and S103 may be implemented simultaneously in parallel, or may be implemented in any order.

In step S104, by the interface generating unit 103, the interface-providing apparatus 100 generates and outputs display information for displaying the feedback input interface in association with each of the keywords identified in the displayed dialogue data. The display information generated by the interface generating unit 103 is, again, received by the output device 1006, and is displayed as a display screen.

Subsequently, in step S105, the interface-providing apparatus 100 waits for a feedback input ("feedback") to be made by the management user via the feedback input interface, or a display request ("display response") of a response sentence for confirmation after the feedback is reflected and the degree of usefulness of the keyword is adjusted.

In the case of receiving the feedback input from the management user (step S105: feedback), in step S106, based on the feedback input, the degree of usefulness updating unit 104 updates a value of the data indicating degree of usefulness stored in the degree of usefulness storage unit 106 for a corresponding keyword. In the case of receiving the display request of the response sentence for confirmation (step S105: display response), in step S107, the confirming response generating unit 105 refers to the latest data indicating degree of usefulness stored in the degree of usefulness storage unit 106, generates a system response sentence that includes a keyword in accordance with the degree of usefulness as an exemplification word, and outputs the sentence for display. In either case, the processing returns to step S105, and the interface-providing apparatus 100 waits for the next operation to be made by the user.

Although it is not clearly described in particular, the processing flow may be ended in accordance with any ending condition.

In the above manner, in the processing shown in FIG. 3, the feedback input and the display request of the response sentence for confirmation, in which the updated degree of usefulness is reflected, are received separately from the user. However, the system response sentence in which the updated degree of usefulness is reflected may be displayed at the same time as performing the feedback input.

Figure 4:
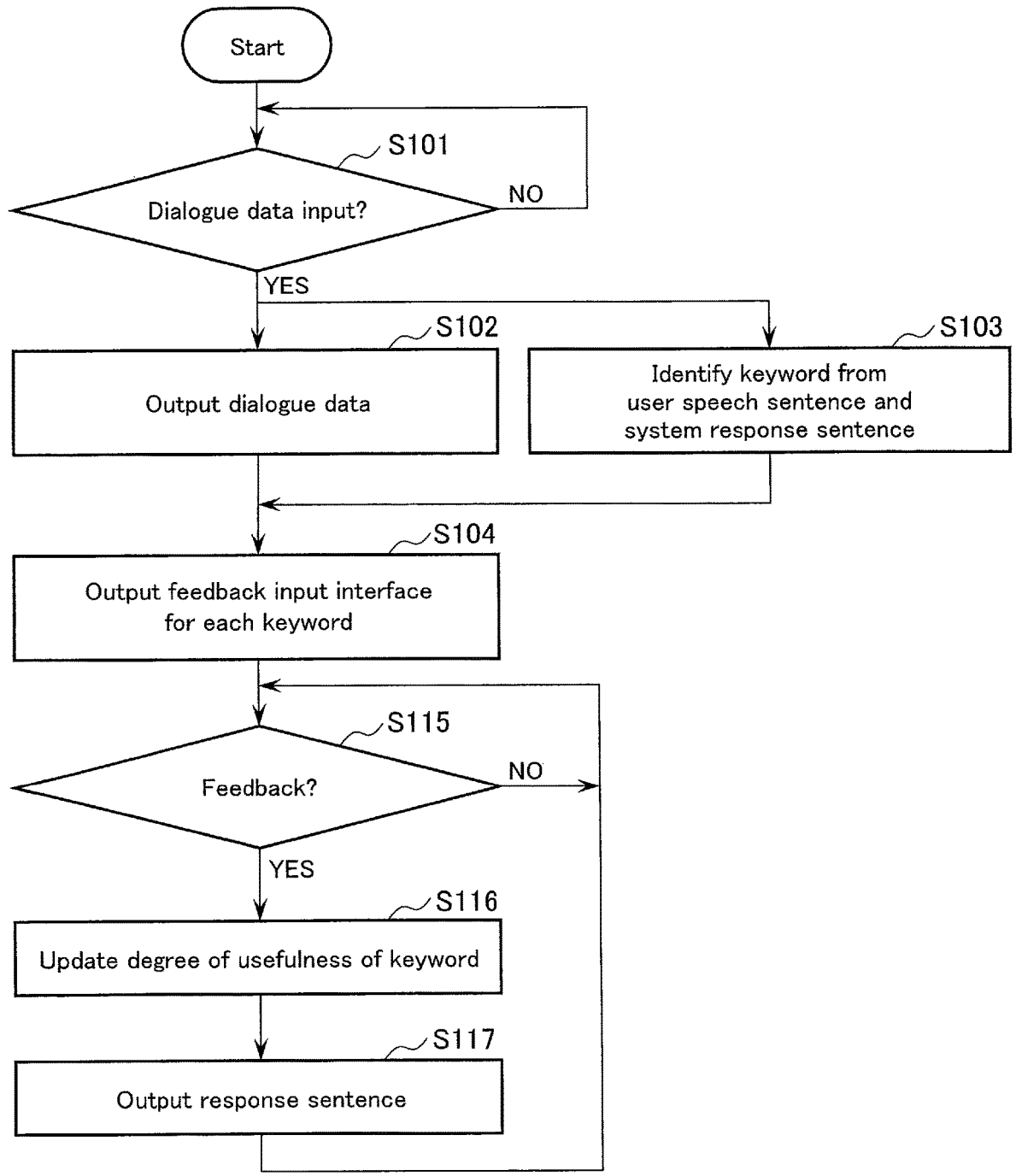
FIG. 4 is a flowchart showing a second example of a processing operation performed by the interface-providing apparatus according to the first embodiment.

As an example of such processing operation, FIG. 4 is a flowchart schematically showing a second example of a processing operation of the interface-providing apparatus 100.

In steps S101 to S104, the same processing as in the first example is performed. That is, dialogue data is waited to be input (step S101), display data for displaying interactions is generated and output to the user when the dialogue data is received (step S102), a keyword is identified from a user speech sentence and a system response sentence in the dialogue data (step S103), and display information is generated and output to display a feedback input interface in association with each keyword (step S104).

Subsequently, in step S115, the interface-providing apparatus 100 waits for the feedback input to be made by the management user, and, in the case where the feedback input is received (step S115: YES), in step S116, based on the feedback input, the degree of usefulness updating unit 104 updates the degree of usefulness of a corresponding keyword. Subsequently, in step S117, the confirming response generating unit 105 refers to the updated data indicating degree of usefulness of keyword, generates the system response sentence that includes a keyword in accordance with the degree of usefulness as an exemplification word, and outputs the sentence for display. Subsequently, the processing returns to step S115, and the interface-providing apparatus 100 waits for the feedback input to be made again by the user. The operation to output the response sentence in accordance with the display request of the response sentence for confirmation as shown in FIG. 3 may further be added to the flowchart shown in FIG. 4.

Figure 5:
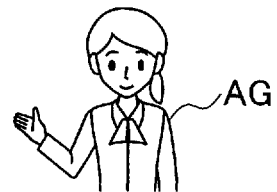
FIG. 5 shows an example of a display screen including a user interface provided by the interface-providing apparatus according to the first embodiment.
Figure 6:
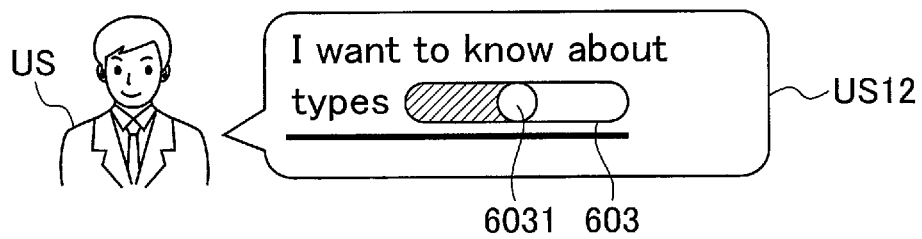
FIG. 6 shows another example of a user interface provided by the interface-providing apparatus according to the first embodiment.
Figure 7:
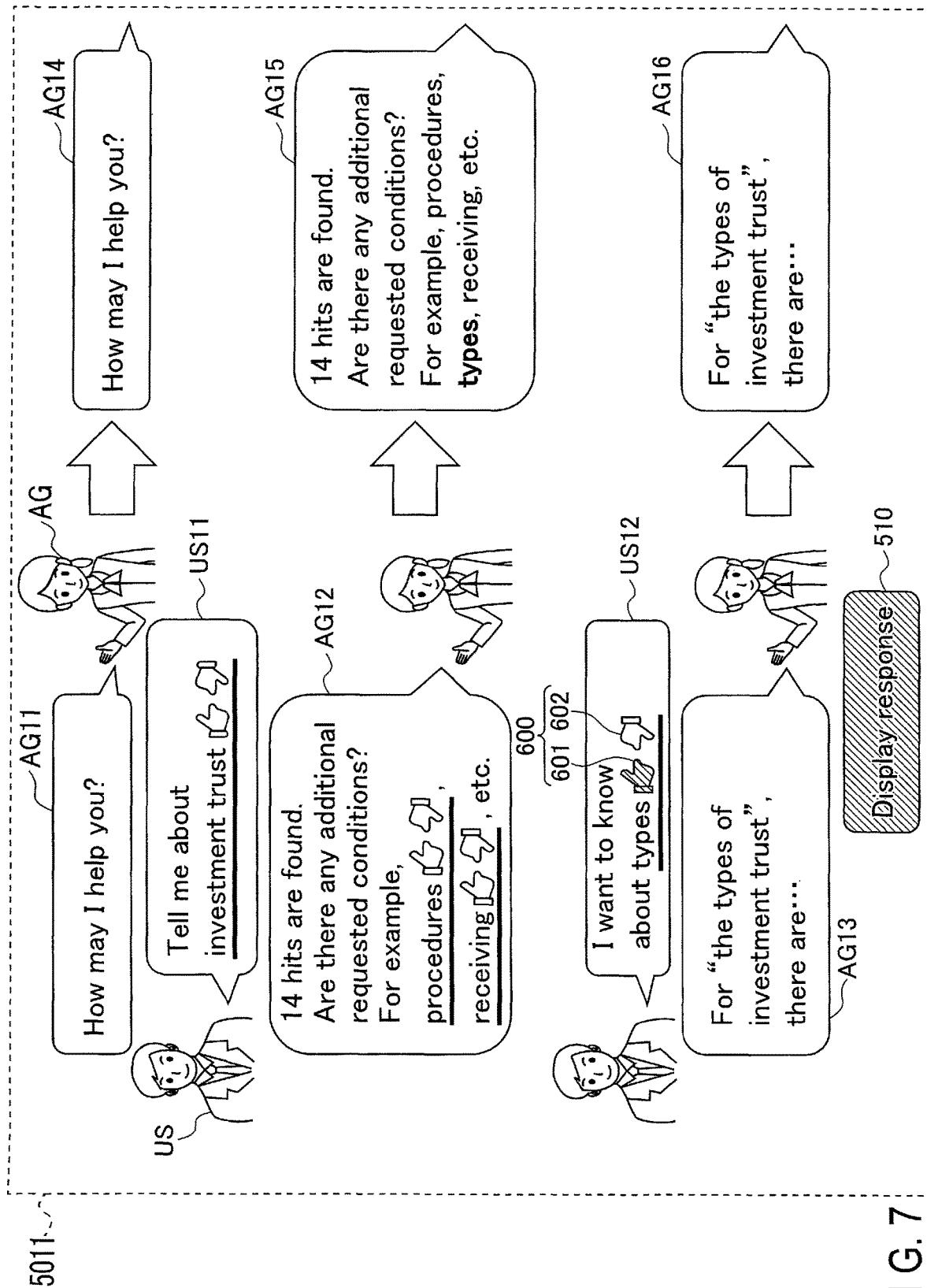
FIG. 7 shows an example of a display screen after a feedback input via the user interface shown in FIG. 5 is reflected.

With reference to FIG. 5 to FIG. 7, a specific example of a manager of the dialogue system (management user) adjusting the degree of usefulness of a keyword used in the inquiry sentence from the system will be explained. Here, the dialogue system is explained as a dialogue system for answering frequently asked questions (FAQ) at a bank.

FIG. 5 shows an example of a display screen displayed for the management user. A display screen 501 is generated by the interface-providing apparatus 100 based on dialogue data from a dialogue log of a certain period designated by the management user, and is displayed on, for example, the output device 1006, such as a liquid crystal display. The display screen 501 includes an agent character AG expressing the dialogue system, a user character US expressing a general user, response sentences AG11 to AG13 of the dialogue system, speech sentences US11 to US12 of the user, and a display response button 510 to receive a display request of a response sentence for confirmation. The response sentence AG11 is an initial response sentence that is displayed upon startup of the dialogue system. Since it is not an inquiry sentence for narrowing down a user's request, the display may be omitted for the management user.

The display screen 501 also includes a feedback input interface 600 that is associated with each keyword (in this example, "investment trust", "procedure", "receiving", and "type") emphasized by underscoring. In this example, the feedback input interface 600 includes a "Like!" button 601 showing a thumbs-up hand shape, and a "Dislike!" button 602 showing a thumbs-down hand shape. In order to simplify the drawing, referential symbols 600, 601, and 602 are applied only to a portion in the entire drawing.

The "Like!" button 601 may be used for a feedback input to show that the keyword is appropriate. The "Dislike!" button 602 may be used for a feedback input to show that the keyword is inappropriate. For example, by pressing the button 601 or 602 as the feedback input, the management user can adjust the degree of usefulness. These buttons may be configured to be able to be pressed a plurality of times. In such case, numbers indicating how many times the button was pressed may be displayed around each button.

The interface-providing apparatus 100 acquires information on the number of times which of the buttons was pressed together with the displayed condition of interaction, and updates the degree of usefulness. For example, under the control of the degree of usefulness updating unit 104, the interface-providing apparatus 100 can update the degree of usefulness value of a corresponding keyword as "+1" if the "Like!" button is pressed once, and the degree of usefulness value of a corresponding keyword as "−2" if the "Dislike!" button is pressed twice. Alternatively, in the case where the data indicating degree of usefulness of keyword includes both the global degree of usefulness and the local degree of usefulness in the manner described above, if the "Like!" button is pressed once, the local degree of usefulness corresponding to the condition of interaction at that time may be described as "+1", and the global degree of usefulness that does not depend on the condition may be described as "+0.1".

It should be noted that what is displayed in FIG. 5 is merely an exemplification, and that various methods may be considered for the method of displaying the input interface 600. For example, in FIG. 5, two buttons 601 and 602 are displayed side by side beside each keyword; however, the keyword may be emphasized by highlighting or inverted colors, etc. Furthermore, instead of displaying the buttons at all times, buttons 601 and 602 may be displayed only when a keyword is designated by being clicked, etc. Furthermore, only one of the "Like!" button 601 or the "Dislike" button 602 may be displayed. The shape of each button may be any shape as long as the keyword can be understood as being appropriate or inappropriate.

As another display example of the feedback input interface 600, FIG. 6 shows a slider bar 603 that can be used instead of the buttons 601 and 602. The slider bar 603 is associated with the keyword "type" in the user speech sentence US12, and receives a feedback input in accordance with the position of a handle 6031. By sliding the handle 6031 from side to side (for example, by sliding the handle 6031 to the right in the case where the degree of usefulness needs to be high), the degree of usefulness of the keyword can be adjusted.

FIG. 7 shows an example of a display screen when the "Like!" button 601 of the keyword "type" in the user speech sentence US12 is pressed in the display screen 501 of FIG. 5, and, subsequently, the display response button 510 is further pressed. A display screen 5011 may also be displayed on the liquid crystal display, etc., in response to these buttons being pressed, based on the display information generated by the interface-providing apparatus 100.

The display screen 5011 includes, on the left side, dialogues AG11 to AG13 and US11 to US12 that were generated before the feedback input, and, on the right side, response sentences for confirmation AG14 to AG16 which were generated after the feedback is reflected. To show that the "Like!" button 601 in US12 and the display response button 510 have been pressed, the buttons are displayed by changing colors.

In this example, since the management user performed a feedback input indicating that the keyword "type" is appropriate, the degree of usefulness updating unit 104 updated the degree of usefulness of "type" to a higher value, and the confirming response generating unit 105 generated a response sentence AG15 as an inquiry sentence including the keyword "type" as an exemplification word by referring to the updated data indicating degree of usefulness. In the response sentence AG15, "type" is included as the exemplification word in addition to the keywords "procedure" and "receiving" with respect to the response sentence AG12 generated before the feedback input. The order in which the exemplification words appear may be based on the level of degree of usefulness, or may be set so that a specific keyword (for example, "procedure" and "receiving") is used at a specific position at all times.

The number of exemplification words to be included in the response sentence may be set freely. For example, the value of the degree of usefulness may be used to extract a keyword with a value equal to or higher than a specific threshold value, and all of such keywords may be included as the exemplification words, or a specific number of keywords may be extracted in order from those with the highest degree of usefulness. In this example, when the display response button 510 is pressed, all of the displayed system response sentences are regenerated under the same condition. However, since response sentences AG14 and AG16 were not influenced by the updated degree of usefulness, the same contents as the response sentences AG11 and AG13 before the feedback input are displayed.

In this manner, since the degree of usefulness of each keyword can be fed back directly, and the result thereof can be confirmed, the system manager can easily adjust the degree of usefulness of the keyword to be included in the response sentence.

As described above, the degree of usefulness of the keyword "type" may be adjusted uniformly regardless of the condition, or the degree of usefulness of only the "type" may be adjusted under a condition that information relating to "investment trust" is required. Again, both the global degree of usefulness and the local degree of usefulness may be adjusted in the manner described above.

The display request of a response sentence for confirmation in which the feedback is reflected may be implemented in various ways. FIG. 7 shows a spec in which a response sentence for confirmation is displayed by pressing the display response button 510 after the feedback is performed. However, as described in the flowchart of FIG. 4, the response sentence for confirmation may also be automatically displayed when the feedback is performed.

Furthermore, for example, the display request may be regarded as being made by clicking the response sentence AG12 of FIG. 7, and the response sentence for confirmation AG15 corresponding to the condition of the response sentence AG12 may be displayed. Alternatively, the management user may arbitrarily designate a condition of the interaction and have a response sentence that is applicable to such condition displayed.

The response sentence for confirmation may be displayed in various ways. In FIG. 7, the response sentences for confirmation AG14, AG15, and AG16 are displayed adjacent to the system response sentences AG11, AG12, and AG13 before feedback input. However, the original response sentences may be overwritten directly, or the response sentences for confirmation may be displayed in another window. Furthermore, the changed portion may be made recognizable by describing only the changed portion of the exemplification word in a bold font in the manner shown in FIG. 7, or by displaying the changed response sentence by changing its background.

(1-3) Effect

In a dialogue system that allows high flexibility in a user speech, as described above, in order to perform smooth interactions with a user, the keyword to be included in the inquiry sentence from the system becomes important. Therefore, for example, a method of applying a model that is generated to select an optimal keyword in accordance with the situation of the dialogue may be considered. However, a method in which a manager of the dialogue system can customize an appropriate keyword is considered particularly useful.

According to the interface-providing apparatus 100 of the first embodiment, a feedback input interface that is capable of providing feedback on whether or not the keyword used for searching information was appropriate is provided to each of the keywords included in the speech sentence of the user and the response sentence of the system. The system manager can easily perform feedback on which keyword is appropriate via the displayed interface. In this manner, since the keyword exemplified to the user in the inquiry sentence from the system side becomes useful to advance interactions, smoother interactions can be realized with the user.

(2) Second Embodiment

In the first embodiment, an example of the interface-providing apparatus adjusting the keyword by reading a past dialogue log as dialogue data has been given. However, the keyword adjustment may also be made to be performed when interactions are actually being performed with the dialogue system. Furthermore, in the first embodiment, when confirming the operation, the system response sentence was displayed under a specific condition, such as a dialogue record; however, the operation may also be confirmed while interactions are actually being performed.

In an interface-providing apparatus according to the second embodiment, a feedback input interface is displayed for a keyword included in a user speech sentence and a system response sentence during interactions with a dialogue system. Furthermore, the interface-providing apparatus according to the second embodiment can adjust a keyword to be included in an inquiry sentence by having a management user him- or herself exchange dialogues with the dialogue system after data indicating the degree of usefulness of keyword is updated by performing a certain degree of feedback.

(2-1) Configuration

FIG. 8 is a block diagram schematically showing a function configuration of an interface-providing apparatus 200 according to the second embodiment.

The interface-providing apparatus 200 is, for example, a computer used by a system manager managing a dialogue system, and comprises a dialogue processing unit 201, a keyword identifying unit 102, an interface generating unit 103, and a degree of usefulness updating unit 104 as processing function units. The interface-providing apparatus 200 further comprises a degree of usefulness storage unit 106. Since the keyword identifying unit 102, the interface generating unit 103, the degree of usefulness updating unit 104, and the degree of usefulness storage unit 106 are the same as those in the first embodiment, the same reference numbers as those used in FIG. 1 will be applied, and detailed explanations thereof will be omitted.

The dialogue processing unit 201 receives a speech sentence from a user, and generates and outputs a response sentence in response thereto. In the second embodiment, a user who inputs a speech sentence and a user who inputs a feedback may both be a management user; however, the user is not limited thereto. Furthermore, the speech sentence from the user may be a result of performing voice recognition with respect to a spoken voice input by the user via a microphone, etc., or may be a text input by the user via a keyboard, etc. The response sentence of the system may not only be displayed in the form of a text, but may also be output by being converted into speech by voice synthesis.

When deciding on how to generate the system response sentence from the received speech sentence of the user, an existing technique in each module can be adopted. Existing techniques include performing text analysis with respect to the speech sentence, performing knowledge retrieval based on the text analysis result, performing system behavior selection based on the text analysis result, the knowledge retrieval result, or a dialogue scenario prepared in advance, and generating the response sentence from the selected behavior. All or a part of the processing of the above-described module may be performed together.

When including an exemplification word in the system response sentence, the dialogue processing unit 201 may also refer to the latest data indicating degree of usefulness stored in the degree of usefulness storage unit 106. Therefore, every time a user performs a feedback input and the data indicating degree of usefulness is updated, the exemplification word included in the response sentence may also be changed.

The keyword identifying unit 102 identifies a keyword with respect to the interactions performed by the dialogue processing unit 201. In FIG. 8, the dialogue processing unit 201 and the keyword identifying unit 102 are shown as separate function units; however, the processing performed by the keyword identifying unit 102 may be implemented in the dialogue processing unit 201.

The interface-providing apparatus 200 according to the second embodiment can comprise a hardware configuration similar to that described in relation to the first embodiment with reference to FIG. 2.

(2-2) Operation

An operation of the interface-providing apparatus 200 according to the second embodiment will be described.

Figure 9:
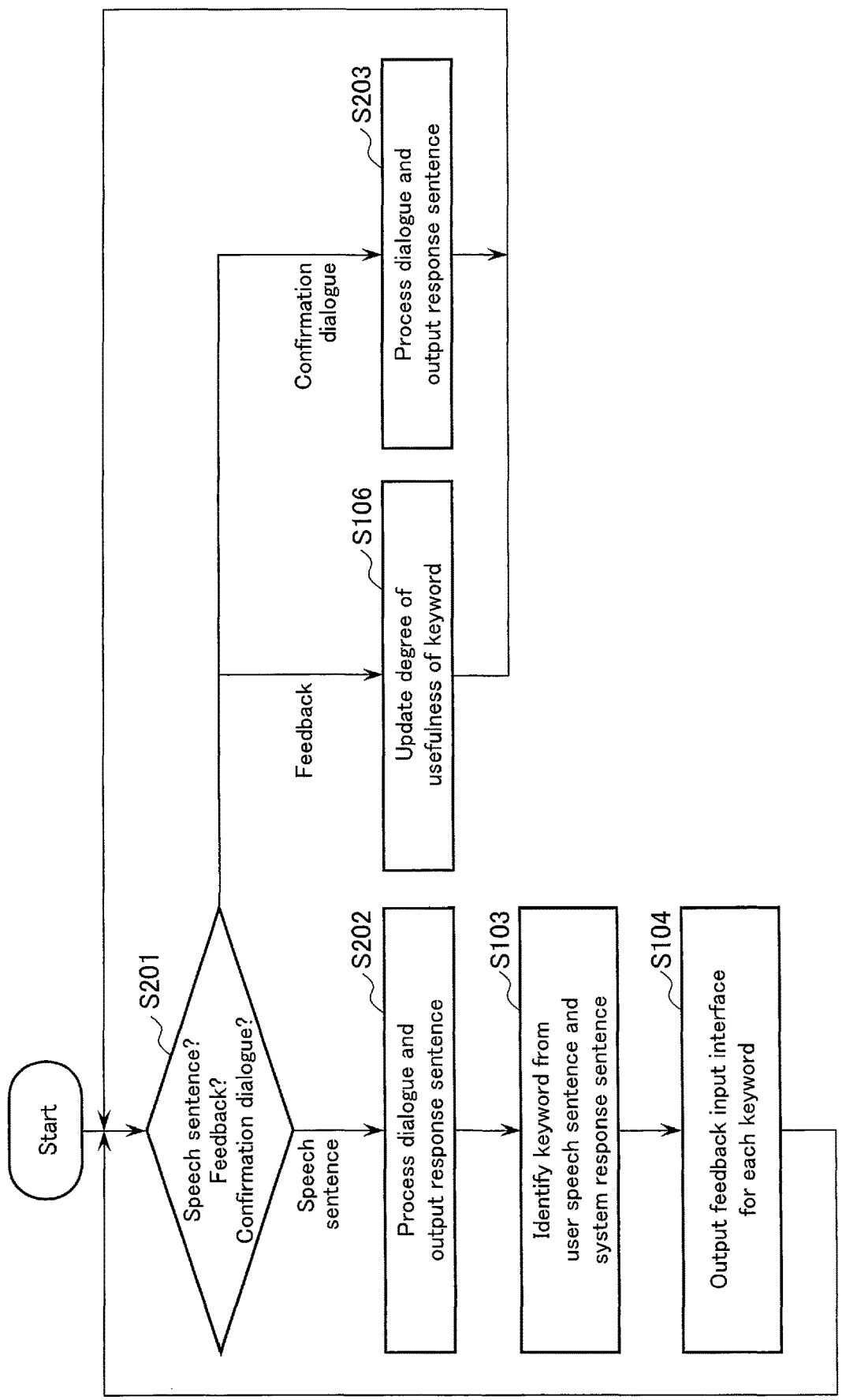
FIG. 9 is a flowchart showing an example of a processing operation performed by the interface-providing apparatus according to the second embodiment.

FIG. 9 is a flowchart schematically showing an example of a processing operation of the interface-providing apparatus 200. Since steps S103, S104, and S106 are the same as those in the first embodiment, the same reference numbers as those used in FIG. 3 will be applied, and detailed explanations thereof will be omitted.

First, in step S201, the interface-providing apparatus 200 waits for input to be made by the user. Here, the input to be made by the user may be assumed as a speech sentence for current interactions ("speech sentence"), if a feedback input interface is displayed, a feedback via the interface ("feedback"), or, if data indicating degree of usefulness of keyword is updated, a speech sentence for confirming the operation ("confirmation dialogue").

In the case where the speech sentence for current interactions is received (step S201: speech sentence), the processing shifts to step S202. In step S202, by the dialogue processing unit 201, the interface-providing apparatus 200 performs dialogue processing with respect to the received speech sentence, and generates and outputs a response sentence. Subsequently, in step S103, the keyword identifying unit 102 identifies a keyword from the user speech sentence and the system response sentence. In step S104, the interface generating unit 103 generates and outputs a feedback input interface for each keyword. The processing of step S202 and step S103 may be performed in reverse order, or may be implemented simultaneously in parallel. Subsequently, the processing returns to step S201, and the interface-providing apparatus 200 waits for input to be made again by the user.

In step S201, in the case where the feedback input is received (step S201: feedback), the processing shifts to step S106, and, in the same manner as the first embodiment, the data indicating degree of usefulness of keyword stored in the degree of usefulness storage unit 106 is updated by the degree of usefulness updating unit 104. Subsequently, the processing returns to step S201 again.

In step S201, in the case where the speech sentence for operation confirmation is received (step S201: confirmation dialogue), the processing shifts to step S203, and the dialogue processing unit 201 performs dialogue processing with reference to the updated latest data indicating degree of usefulness of keyword, and generates and outputs a response sentence. Subsequently, the processing returns to step S201 again.

Here, even in the case where other inputs such as feedbacks are performed during the interaction, the interaction may be stored in the states of the current dialogue and the dialogue for operation confirmation so that, when the next speech is received, the interaction may continue from the state of the stored dialogues. Furthermore, in the case where one of the dialogues is started, the other dialogue may be ended. For example, in the case where the dialogue for operation confirmation is started, the current dialogue may be ended. Furthermore, when the data indicating degree of usefulness of keyword is updated during the current interaction, the dialogue processing unit 201 may perform a response reflecting the updated data indicating degree of usefulness for every update, or may proceed with the interaction in the state where the data indicating degree of usefulness of keyword remains the same as at the time of starting the interaction.

Now, with reference to FIG. 10 to FIG. 11, a specific example of a manager of a dialogue system (management user) adjusting a keyword while interacting with the system will be explained. Here, the dialogue system is explained as a dialogue system for answering bank-related FAQ.

Figure 10:
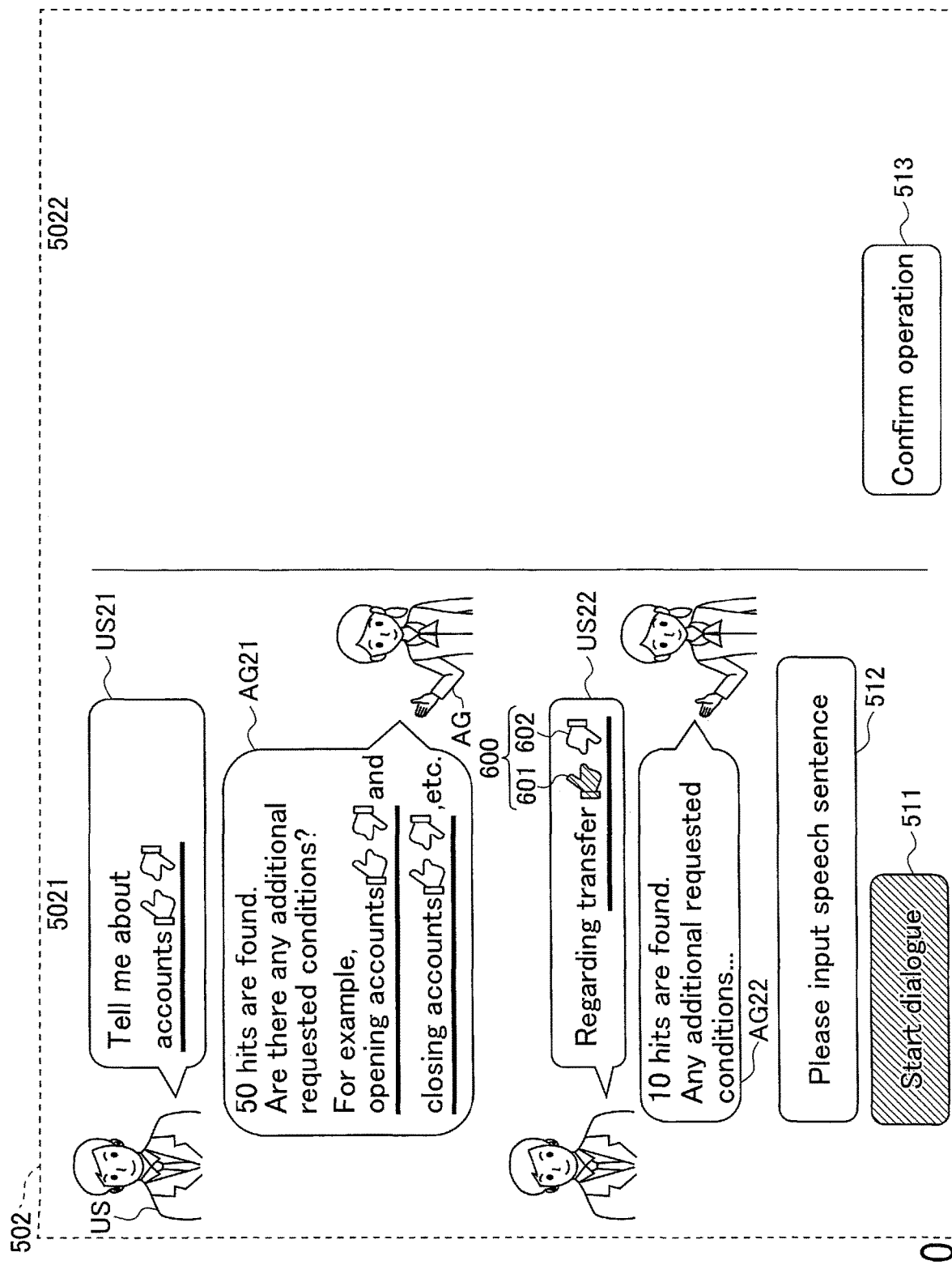
FIG. 10 shows an example of a display screen including a user interface provided by the interface-providing apparatus according to the second embodiment.

FIG. 10 shows an example of a display screen displayed for a management user in a state where the management user is interacting with the system. A display screen 502 is generated from the user speech sentence and the system response sentence of the current interaction, and is displayed on a liquid crystal display, etc., by the interface-providing apparatus 200. The display screen 502 is basically divided into two. A display screen 5021 on the left side is used for displaying the current interaction, and a display screen 5022 on the right side is used for displaying the operation confirmation.

The display screen 5021 includes a user character US, an agent character AG, user speech sentences US21 to US22, system response sentences AG21 to AG22, and a start dialogue button 511. In FIG. 10, the start dialogue button 511 is active, and a message field 512 to prompt a user to speak is also displayed on the display screen 5021. The display screen 5021 also includes a "Like!" button 601 and a "Dislike!" button 602 displayed in association with each specified keyword (here, "account", "open account", "close account", and "transfer") as a feedback input interface 600. The display screen 5022 includes a confirm operation button 513. In this state, the management user may input the next speech sentence in accordance with the message 512, or may perform feedback input via the feedback input interface 600.

In the display screen 5021, in response to "Tell me about accounts" input in the user speech sentence US21, an inquiry sentence AG21 from the system, such as "50 hits are found. Are there any additional requested conditions? For example, opening accounts and closing accounts.", is displayed since there are a plurality of items of the FAQ system that correspond to "accounts", and the search target needs to be narrowed down to a further extent. The user speech sentence US22 "regarding transfer" in response to this includes a keyword "transfer" that is not included in the latest inquiry sentence AG21. Although keywords such as "account" and "transfer" are obtained from the user US, since the search target still needs to be narrowed down, the inquiry sentence AG22 is displayed to inquire further about additional conditions with respect to the user speech sentence US22.

Figure 11:
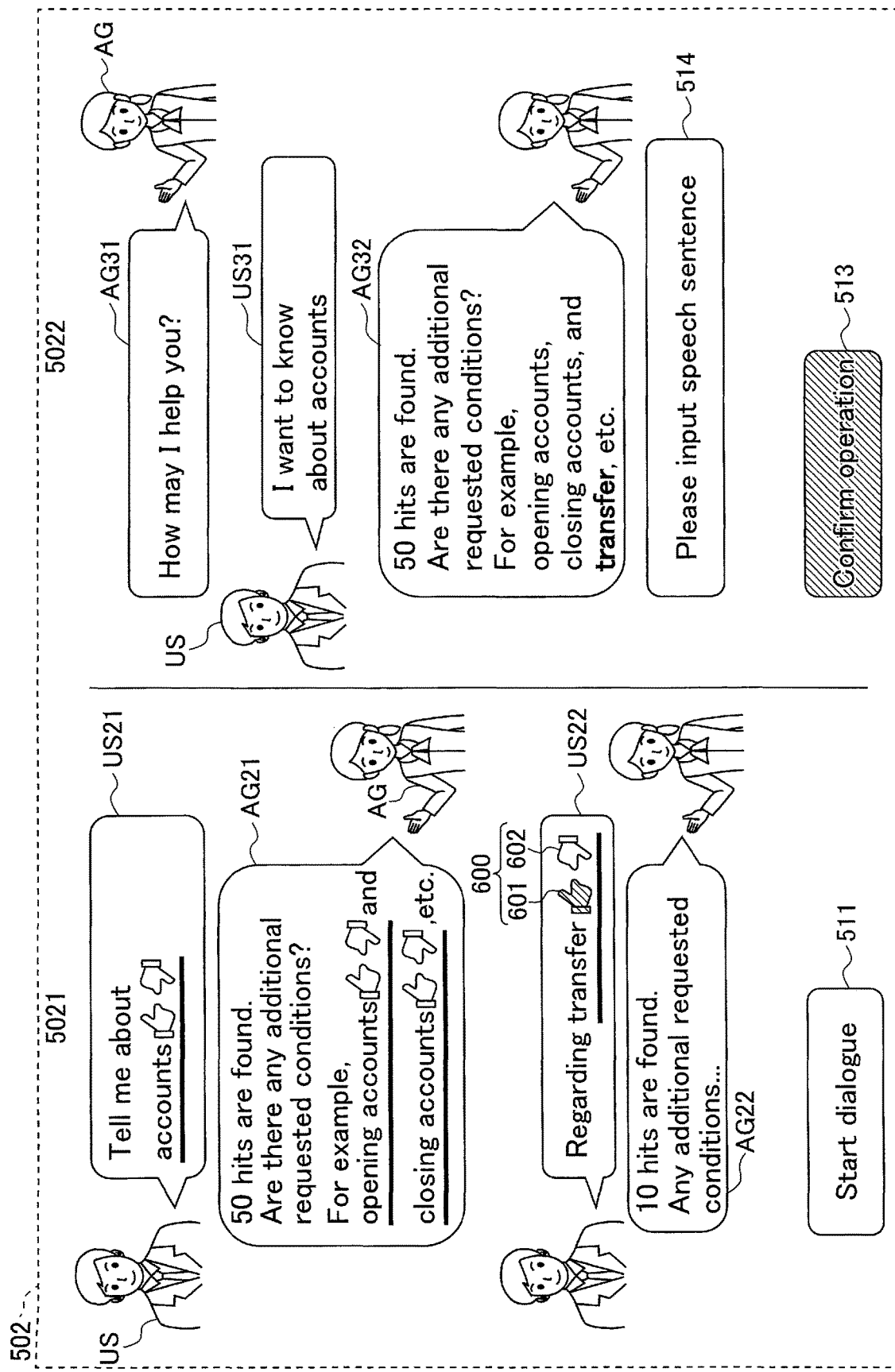
FIG. 11 shows an example of a display screen after a feedback input via the user interface shown in FIG. 10 is reflected.

FIG. 11 shows an example of a display screen when the "Like!" button 601 of the keyword "transfer" in US22 is pressed as a feedback input in the display screen 502 of FIG. 10, and, subsequently, the confirm operation button 513 is further pressed to perform interaction for operation confirmation. On the display screen 502, the confirm operation button 513 becomes active, and new dialogues AG31 to AG32 and US31 for operation confirmation are displayed on the display screen 5022 on the right side of the display screen 502. In response to "I want to know about accounts" input in the speech sentence US31, an exemplification word such as "transfer" appears in the response sentence AG32 based on the data indicating degree of usefulness in which the feedback is reflected. In this manner, the management user can confirm that a result of performing a feedback that the "transfer" is an appropriate keyword has been reflected.

In the above, it has been explained that the dialogue for confirmation may be displayed in the adjacent screen by pressing the confirm operation button 513; however, the operation example is not limited thereto. In the same manner as the operation example of the first embodiment, in the second embodiment, a dialogue for confirming operation may be automatically started by performing feedback with respect to a keyword, or the dialogue for confirming operation may be displayed on a separate window.

(2-3) Effect

Therefore, in the interface-providing apparatus 200 according to the second embodiment, a feedback input interface is displayed for a user speech sentence and a system response sentence during interactions between a user and a dialogue system. In this manner, the user can adjust the degree of usefulness of the keyword by inputting a feedback while interacting with the system, and, at any timing, interact with the dialogue system that refers to the updated degree of usefulness of the keyword and confirm the operation.

(3) Third. Embodiment

In the first embodiment and the second embodiment, the system manager, in particular, provided feedbacks to each keyword of the user speech sentence and the system response sentence on whether or not the keyword is appropriate.

An interface-providing apparatus according to the third embodiment provides a feedback input interface that allows a general user to input a feedback on whether or not the search result obtained by an interaction and the interaction itself are appropriate, so that the feedback from the general user can be reflected.

(3-1) Configuration

FIG. 12 is a block diagram schematically showing a function configuration of an interface-providing apparatus 300 according to the third embodiment.

The interface-providing apparatus 300 according to the third embodiment is, for example, a computer such as a personal computer or a smart phone used by a general user using a dialogue system, or a digital signage installed at public places.

The interface-providing apparatus 300 comprises a dialogue processing unit 201, a keyword identifying unit 102, an interface generating unit 301, and a degree of usefulness updating unit 302 as processing function units. The interface-providing apparatus 300 further comprises a degree of usefulness storage unit 106. Since the dialogue processing unit 201, the keyword identifying unit 102, and the degree of usefulness storage unit 106 are the same as those in the first or the second embodiment, the same reference numbers as those used in FIG. 1 or FIG. 8 will be applied, and detailed explanations thereof will be omitted.

The interface generating unit 301 generates display information for displaying a feedback input interface for receiving a feedback input from a general user. For example, the feedback input interface according to the third embodiment receives a feedback input on whether or not a search result was appropriate in association with the search result obtained by an interaction between a general user and the system. In the same manner as the first or the second embodiment, various display methods can be adopted for the feedback input interface.

The degree of usefulness updating unit 302 updates data indicating degree of usefulness of keyword based on the feedback input received via the feedback input interface that is displayed based on the display information. For example, the degree of usefulness updating unit 302 calculates the degree of usefulness of each keyword used in the interactions performed until obtaining the search result, and updates the data indicating degree of usefulness of keyword. The matter on how the feedback is reflected on the degree of usefulness of the keyword will be explained later.

The interface-providing apparatus 300 according to the third embodiment can comprise a hardware configuration similar to that described in relation to the first embodiment with reference to FIG. 2.

(3-2) Operation

An operation of the interface-providing apparatus 300 according to the third embodiment will be explained.

Figure 13:
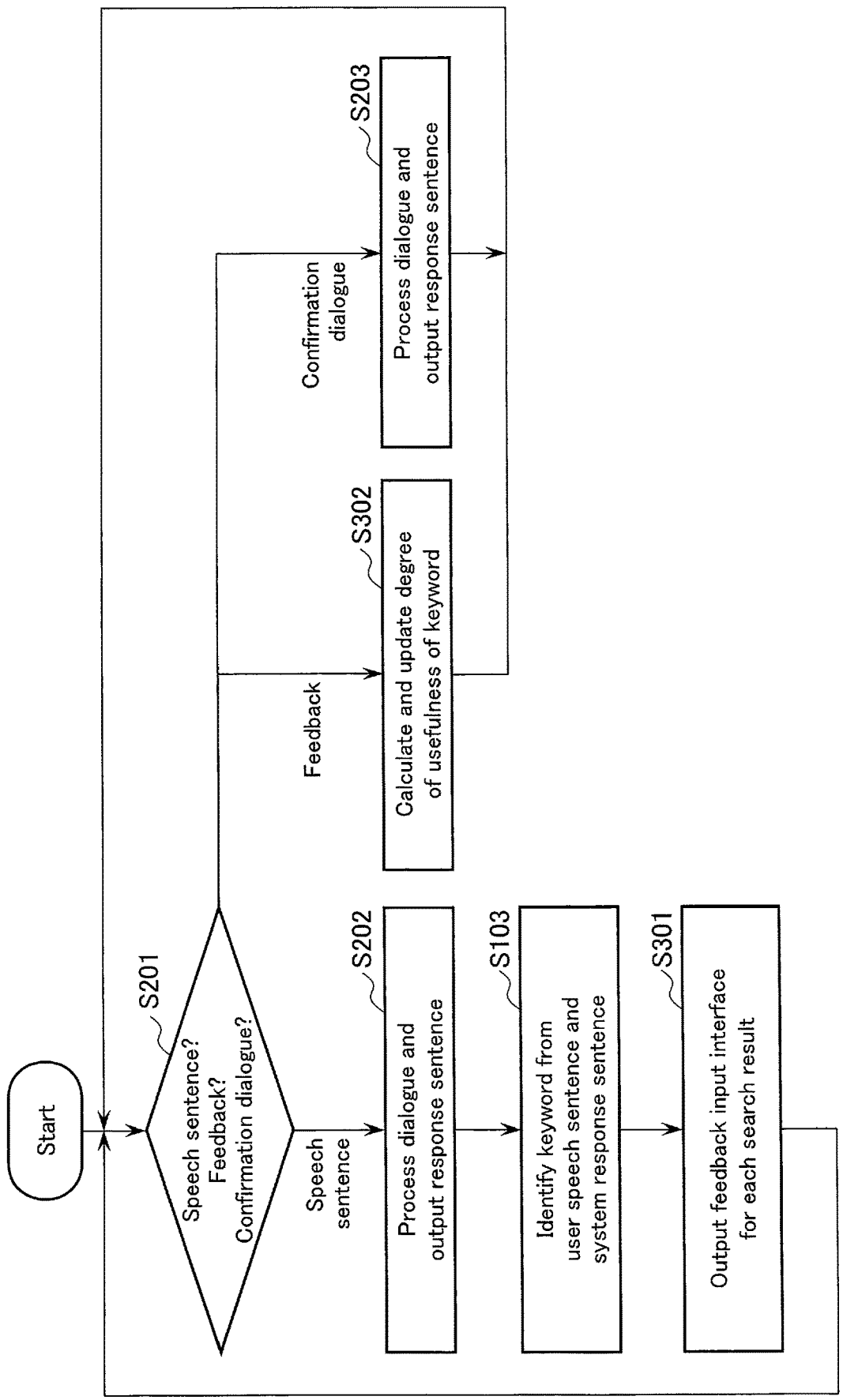
FIG. 13 is a flowchart showing an example of a processing operation performed by the interface-providing apparatus according to the third embodiment.

FIG. 13 is a flowchart schematically showing an example of a processing procedure of the interface-providing apparatus 300. Since steps S103, S201, S202, and S203 are the same as those in the first or the second embodiment, the same reference numbers as those used in FIG. 3 and FIG. 9 will be applied, and detailed explanations thereof will be omitted.

First, in step S201, the interface-providing apparatus 300 waits for a speech sentence, a feedback input, or a speech sentence for confirming operation (confirmation dialogue) to be input.

In the case of receiving a user speech sentence (step S201: speech sentence), the processing shifts to step S202, in which dialogue processing is performed with respect to the received speech sentence by the dialogue processing unit 201, and a response sentence is generated and output. In step S103, the keyword identifying unit 102 identifies a keyword from the user speech sentence and a system response sentence.

In step S301, the interface generating unit 301 generates and outputs display information for displaying a feedback input interface in association with a search result obtained by the general user interacting with the dialogue processing unit 201. Here, the feedback input interface may be displayed for each interaction, or after the search result is obtained. Furthermore, in a state where it is in the middle of an interaction, and the system is in the middle of contacting the user, the feedback input interface may not be displayed for the displayed search result, but may be displayed only for the final search result. The feedback input interface may also be displayed in association with a keyword included in the dialogue.

In the case of receiving the feedback input in step S201 (step S201: feedback), in step S302, the degree of usefulness update unit 302 calculates the degree of usefulness in which the feedback for each keyword used in the interactions performed so far is reflected, and updates the data indicating degree of usefulness of keyword stored in the degree of usefulness storage unit 106.

It should be noted that the keyword identified by the keyword identifying unit 102 may be identified during the dialogue processing as shown in step S103; however, it is not limited thereto. For example, when the feedback input is received (for example, immediately before step S302), the degree of usefulness may be calculated by extracting a keyword from interactions performed so far.

Here, various methods may be adopted for the method on how to reflect the feedback on the degree of usefulness of the keyword. Some examples thereof will be explained with reference to FIGS. 14A to 14C.

Figure 14A:
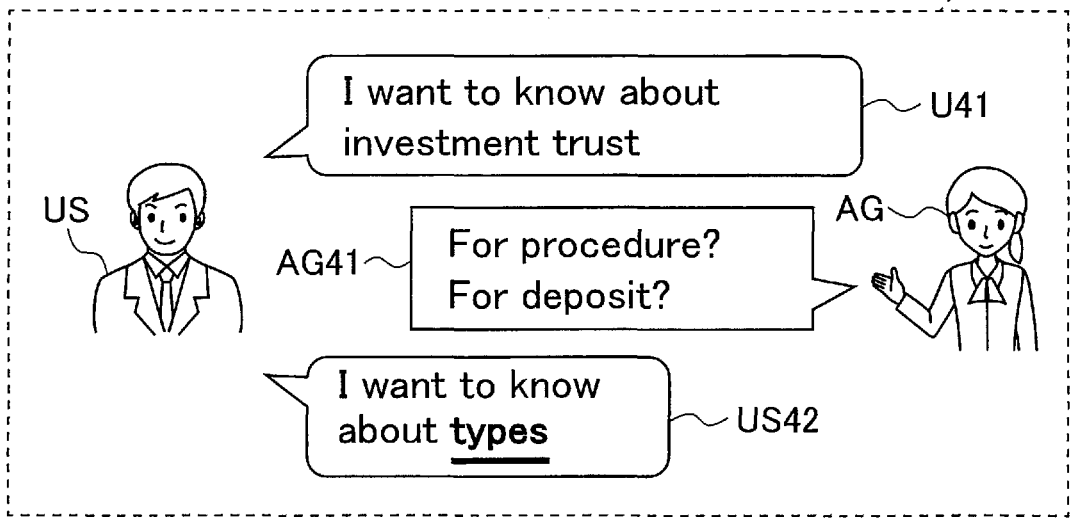
FIG. 14A shows a first example of assigning a weight to a keyword in the interface-providing apparatus according to the third embodiment.

FIG. 14A shows, as a first example, an example of a method of handling the degree of usefulness of a keyword that is not included in the inquiry sentence as being high. A display screen 503 includes user speech sentences US41 to US42 and a system response sentence AG41. In the user speech sentence US42, although "I want to know the types (of investment trust)" is input, the inquiry sentence AG41 immediately before this does not include "type". As in the above keyword "type", among the keywords that are included in the user speech sentence, a keyword that is not included in the system response sentence as an exemplification word may be considered important for obtaining an intended result by the keyword. Therefore, in the case where a feedback is input to a search result as in FIG. 14A, a feedback can be strongly reflected on the degree of usefulness of "a keyword included in a user speech sentence, but not included in an inquiry sentence immediately before the user speech sentence". Examples of "strongly reflecting" may include significantly increasing the degree of usefulness of the keyword "type" (for example, "+2") and increasing the degree of usefulness of other keywords included in the user speech to a smaller extent (for example, "+1"), or adjusting only the degree of usefulness of the keyword "type".

Figure 14B:
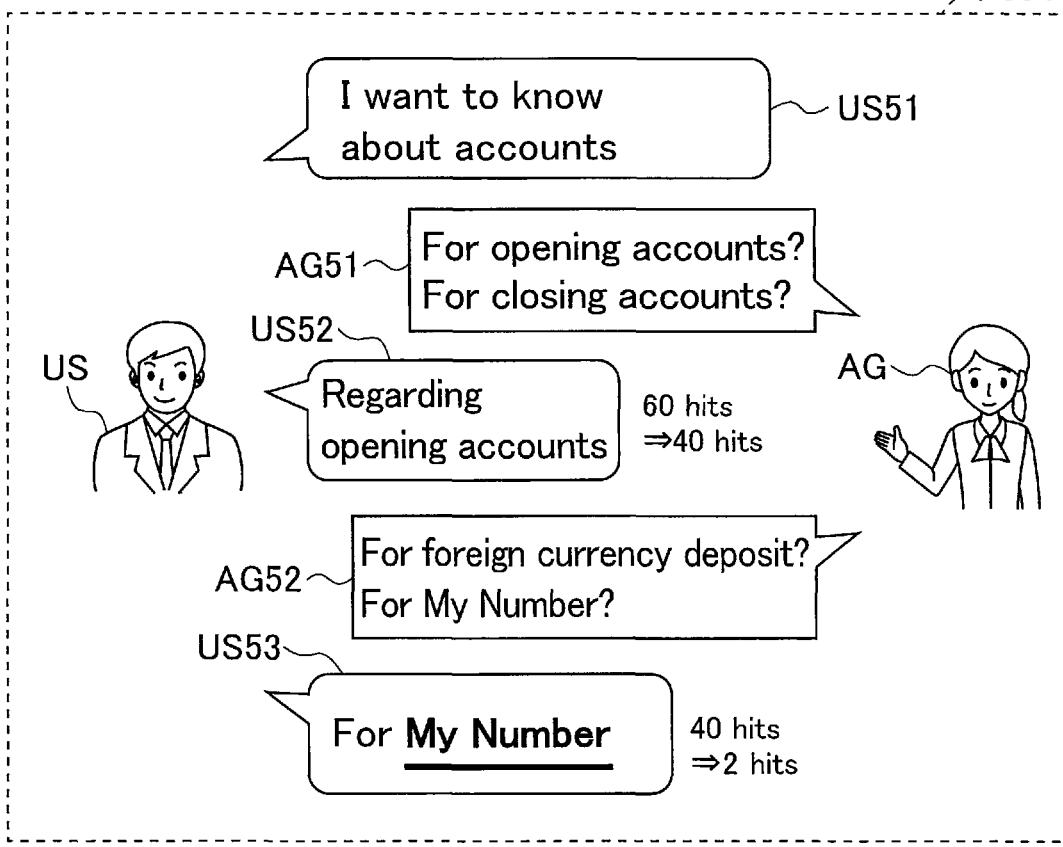
FIG. 14B shows a second example of assigning a weight to a keyword in the interface-providing apparatus according to the third embodiment.

FIG. 14B shows, as a second example, an example of a method of handling the degree of usefulness of a keyword that was able to significantly reduce the number of search results as being high. A display screen 504 includes user speech sentences US51 to US53 and system response sentences AG51 to AG52. In this example, in response to a request "I want to know about accounts" in the user speech sentence US51, the system AG outputs the inquiry sentence AG51 "For opening? For closing?" in order to narrow down the search target. By the user speech sentence US52 replying "For opening" in response to this, the system AG is able to narrow down the search target from 60 hits to 40 hits. However, since it is still necessary to narrow down the search target, the system AG outputs the inquiry sentence AG52 "For foreign currency deposit? For My Number?" By the user speech sentence US53 replying "For My Number" in response to this, the system AG is able to narrow down the search target from 40 hits to two hits.

Therefore, depending on how much the search results were able to be narrowed down may also be an indicator of how important the keyword is. Therefore, in the case where a feedback is input to the search result shown in FIG. 14B, the feedback can be reflected in accordance with the extent to which the search result has been narrowed down. In this example, since the keyword "My Number" contributed to narrowing down the search result from 40 hits to two hits, whereas the keyword "open" contributed to narrowing down the search result from 60 hits to 40 hits, the feedback result is strongly reflected on "My Number". The contribution of the keyword to narrowing down the search results may be determined based on the number of hits obtained after narrowing down the search results, or based on the ratio between the search results obtained before and after narrowing down the search results. Furthermore, in the example of FIG. 14B, only the degree of usefulness of "My Number" may be updated, or the degree of usefulness of "opening" and "My Number" may both be updated by applying weights in accordance with the contributions thereof to narrowing down the search results.

Figure 14C:
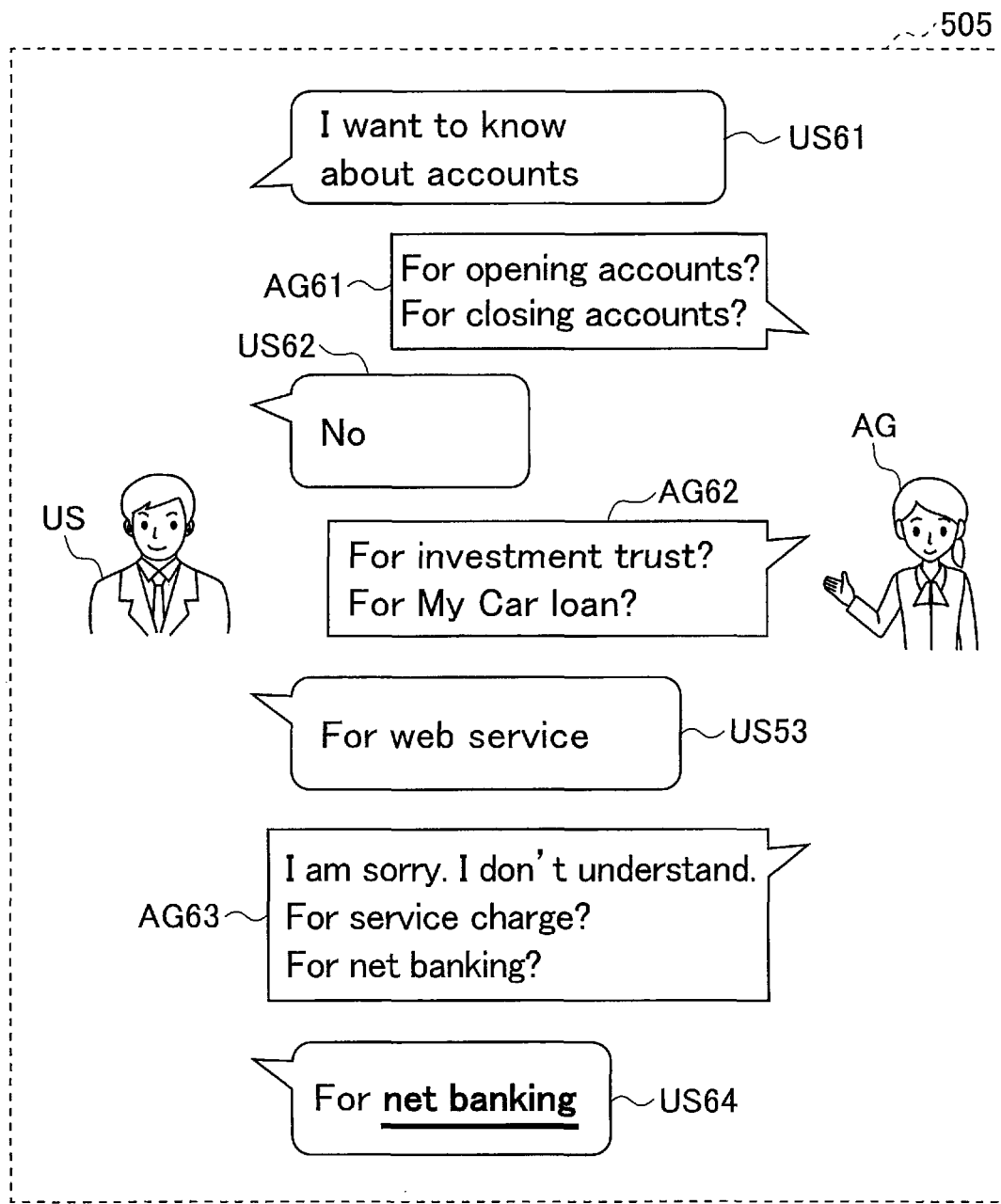
FIG. 14C shows a third example of assigning a weight to a keyword in the interface-providing apparatus according to the third embodiment.

FIG. 14C shows, as a third example, an example of a method of handling the degree of usefulness of a keyword that was able to revive a stagnant interaction as being high. A display screen 505 includes user speech sentences US61 to US64 and system response sentences AG61 to AG63. In this example, since an appropriate exemplification word was not included in the inquiry sentence of the system, the user did not know what to say, which made the interaction stagnant. A keyword that contributed to revive a stagnant interaction may also be considered as an important keyword to proceed with smooth interactions. Therefore, in the case where a feedback is input to a search result as in FIG. 14C, the result of the feedback can be strongly reflected on such a keyword. As indicators to determine whether or not the interaction was stagnant, for example, situations in which the user was unable to answer continued, the same interaction was repeated over a certain number of times or lasted over a certain time, or the search target was failed to be narrowed down can be used.

The feedback reflecting methods mentioned in the examples of FIG. 14A to FIG. 14C may also be used in combination. For example, in the case where two or more keywords among "a keyword included in a user speech sentence, but not included in an inquiry sentence immediately before the user speech sentence", "a keyword successful in narrowing down the search result", and "a keyword that contributed to revive a stagnant interaction" are included in the interactions so far relating to the search results to which feedback is input, the degree of usefulness may be updated by applying a weight in accordance with each condition.

Figure 15:
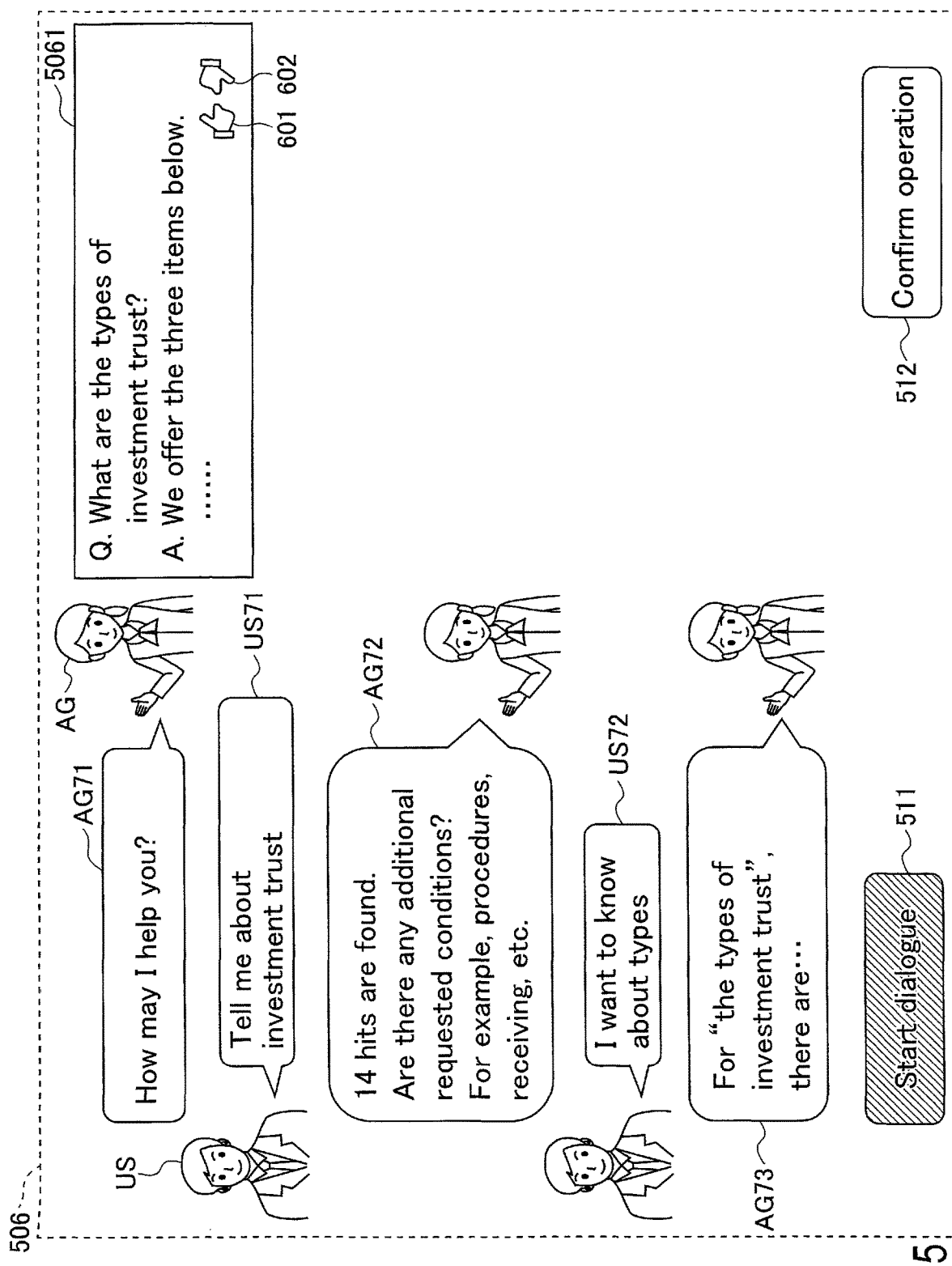
FIG. 15 shows an example of a display screen including a user interface provided by the interface-providing apparatus according to the third embodiment.

FIG. 15 shows a specific operation example of the interface-providing apparatus 300 according to the third embodiment. A display screen 506 shown in FIG. 15 is displayed on, for example, a display device of a computer used by a general user. The display screen 506 includes an agent character AG, a user character US, system response sentences AG71 to AG73, user speech sentences US71 to US72, a start dialogue button 511, a confirm operation button 512, and a box 5061 indicating a search result which is to be the target of a feedback input. In the box 5061, a Q&A relating to the "types of investment trust" is presented as a search result of information requested by the user. Feedback input interfaces 601 and 602 are also displayed in the box 5061.

By pressing the button 601 or 602, a general user can input feedback on whether or not the search result displayed in the box 5061 is appropriate. In the case where a feedback with respect to the search result is input via the "Like!" button 601, the degree of usefulness is reflected on the keyword by the method exemplified with reference to FIGS. 14A to 14C described above. For example, based on the feedback input with respect to the search result, the degree of usefulness of the keyword "type" included in the interaction is updated to a higher value. Therefore, in the interaction when confirming the operation or from subsequent interactions, "type" may tend to be included as a keyword exemplified in the system response sentence.

In the same manners as in the first and the second embodiments, the degree of usefulness of keyword may be updated by using a method that depends on the condition of interaction, or a method that does not depend on the condition of interaction.

It should be noted that, in the third embodiment, the feedback may be made to be input for each search result as in the system response sentences AG72 and AG73 in FIG. 15, or may be provided with respect to the entire interaction as to how the current interaction was as a whole. In such case, for example, in the case of the display screen 506 in FIG. 15, a feedback input interface may be displayed beside the start dialogue button 511. Such a feedback input interface may be displayed at all times, or may be displayed only when the interaction is ended. Such a feedback input interface may also be displayed together with the feedback input interface with respect to each search result. Furthermore, as in the first and the second embodiments, the feedback input interface may be displayed in combination with the feedback input interface with respect to each keyword. The display of each interface may also be switchable between ON and OFF.

(3-3) Effect

In the above manner, the interface-providing apparatus 300 according to the third embodiment provides an interface that can receive from a general user a feedback input on whether or not the search result obtained by the interaction and the interaction itself are appropriate. The feedback input via this interface is reflected as the degree of usefulness of the keyword included in the interaction, and the degree of usefulness of the keyword is adjusted appropriately and updated. In this manner, a feedback from a general user can be reflected to adjust an exemplification word to be included in the inquiry sentence from the system.

It should be noted that the interface-providing apparatus 300 according to the third embodiment is not limited to a computer used by a general user. The interface-providing apparatus 300 may be a server computer, etc., which is managed by a manager of the dialogue system, and which can communicate with a computer used by a general user. The feedback input interface generated by the interface-providing apparatus 300 may also receive feedback input from a management user, and not only from a general user. The feedback input interface generated by the interface-providing apparatus 300 may be displayed on a display device used by a general user or a management user performing feedback input.

(4) Fourth Embodiment

In the first to the third embodiments, the degree of usefulness of the keyword used as an exemplification word in the inquiry sentence from the system is adjusted based on the feedback. However, as the exemplification word included in the inquiry sentence from the system, not only a keyword, but also the name of an attribute (or a category) of the keyword, such as "Tell me the food" or "Where is the location?", can be used. Here, such an attribute (a category) of a keyword will be referred to as a "slot".

In a case where a feedback is input with respect to a keyword or a search result, etc., an interface-providing apparatus according to the fourth embodiment updates the degree of usefulness of the slot so that a user, such as a system manager, can adjust the degree of usefulness of a slot to be included in a system response sentence.

(4-1) Configuration

Figure 16:
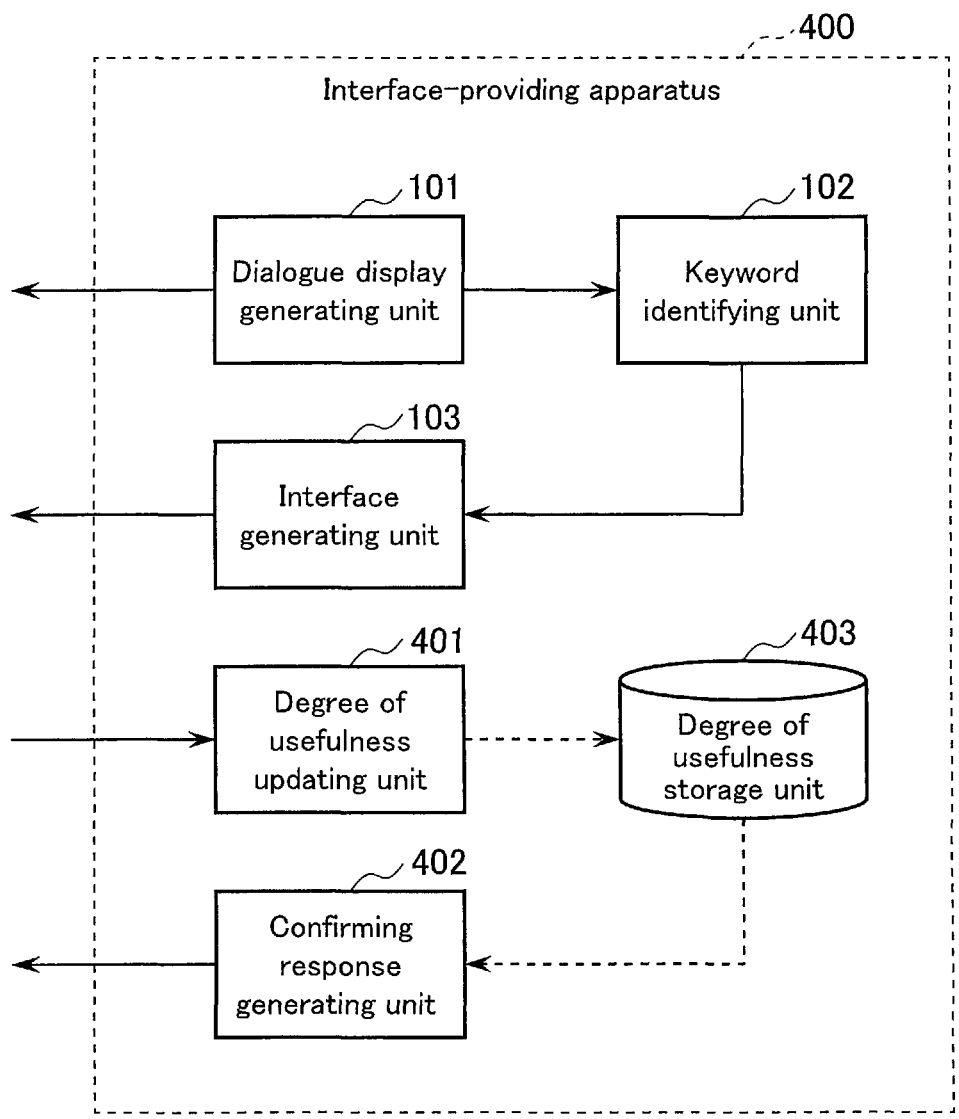
FIG. 16 is a block diagram exemplifying a function configuration of an interface-providing apparatus according to a fourth embodiment.

FIG. 16 is a block diagram schematically showing a function configuration of an interface-providing apparatus 400 according to the fourth embodiment.

The interface-providing apparatus 400 according to the fourth embodiment is, for example, a computer used by a system manager managing a dialogue system, and comprises a dialogue display generating unit 101, a keyword identifying unit 102, an interface generating unit 103, a degree of usefulness updating unit 401, and a confirming response generating unit 402 as processing function units. The interface-providing apparatus 400 further comprises a degree of usefulness storage unit 403. Since the dialogue display generating unit 101, the keyword identifying unit 102, and the interface generating unit 103 are the same as those in the first embodiment, the same reference numbers as those used in FIG. 1 will be applied, and detailed explanations thereof will be omitted.

In the case of receiving a feedback input with respect to a keyword via a feedback input interface, the degree of usefulness updating unit 401 updates the degree of usefulness of a slot of the keyword based on the feedback. The degree of usefulness of the slot is correlated with each slot and is stored as data indicating degree of usefulness of slot in the degree of usefulness storage unit 403 explained later. The degree of usefulness may be updated by various methods such as a method of linearly increasing a degree of usefulness value in accordance with the number of times a good feedback is input, a method of non-linearly increasing the degree of usefulness value using a log, etc., or a method of increasing the degree of usefulness value stepwise for every predetermined number of times.

In the same manner as the confirming response generating unit 105 explained in relation to the first embodiment, the confirming response generating unit 402 generates an inquiry response text under a specific condition, and generates and outputs display information to be displayed. When doing so, the confirming response generating unit 402 refers to the data indicating degree of usefulness of slot and determines a slot to perform inquiry, that is, the name of the slot to be used as the exemplification word. When determining the slot to be used for the response sentence, in addition to the data indicating degree of usefulness slot, other indicators, such as the number of keyword candidates included in the slot, or the extent to which the search result may be assumed to be narrowed down by receiving a keyword for the slot from the user, may also be used.

The degree of usefulness storage unit 403 stores the data indicating degree of usefulness of slot. As explained with respect to the data indicating degree of usefulness of keyword, the data indicating degree of usefulness of slot may also be managed as the degree of usefulness depending on the conditions of interaction, or as degree of usefulness that does not depend on the state of interaction.

The interface-providing apparatus 400 according to the fourth embodiment can comprise a hardware configuration similar to that described in relation to the first embodiment with reference to FIG. 2.

(4-2) Operation

An operation of the interface-providing apparatus 400 according to the fourth embodiment will be described.

Figure 17:
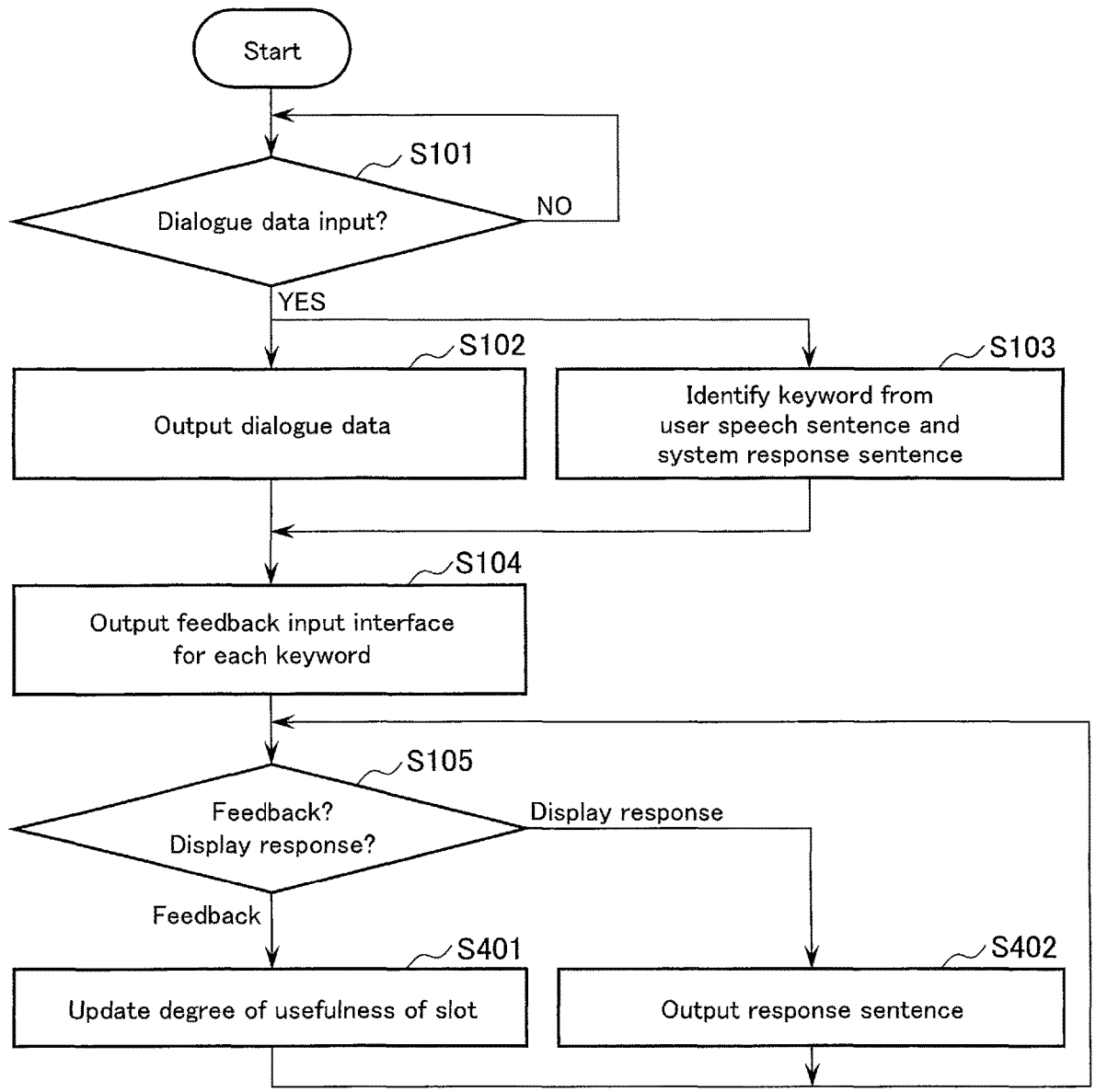
FIG. 17 is a flowchart showing an example of a processing operation performed by the interface-providing apparatus according to the fourth embodiment.

FIG. 17 is a flowchart schematically showing an example of a processing operation of the interface-providing apparatus 400. Since steps S101, S102, S103, S104, and S105 are the same as those in the first embodiment, the same reference numbers as those used in FIG. 3 will be applied, and detailed explanations thereof will be omitted.

First, in step S101, the interface-providing apparatus 400 waits for dialogue data to be input. When the dialogue data is input (step S101: YES), the processing proceeds to a subsequent step. In step S102, by the dialogue display generating unit 101, the interface-providing apparatus 400 generates and outputs display information for displaying interactions for the management user based on the received dialogue data. Furthermore, in step S103, by the keyword identifying unit 102, the interface-providing apparatus 400 identifies a keyword from a user speech sentence and a system response sentence included in the received dialogue data.

In step S104, by the interface generating unit 103, the interface-providing apparatus 400 generates and outputs display information for displaying a feedback input interface in association with each of the keywords identified in the displayed dialogue data. In step S105, the interface-providing apparatus 400 waits for a feedback input or a display request of a response sentence for confirmation.

In the case of receiving the feedback input in step S105 (step S105: feedback), the processing proceeds to step S401. In step S401, in response to a feedback performed with respect to a keyword via the feedback input interface, the interface-providing apparatus 400 updates the degree of usefulness of a slot of the keyword by the degree of usefulness updating unit 401. Subsequently, the processing returns to step S105, and the interface-providing apparatus 400 waits for the next operation to be made by the user.

In the case of receiving the display request of a response sentence for confirmation in step S105 (step S105: display response), the processing proceeds to step S402. In step S402, by the confirming response generating unit 402, the interface-providing apparatus 400 refers to the updated data indicating degree of usefulness of slot, and generates and outputs a response sentence by using the name of the slot with high degree of usefulness under a designated condition as an exemplification word. Subsequently, the processing returns to step S105 again, and the interface-providing apparatus 400 waits for the next operation to be performed by the user.

Figure 18:
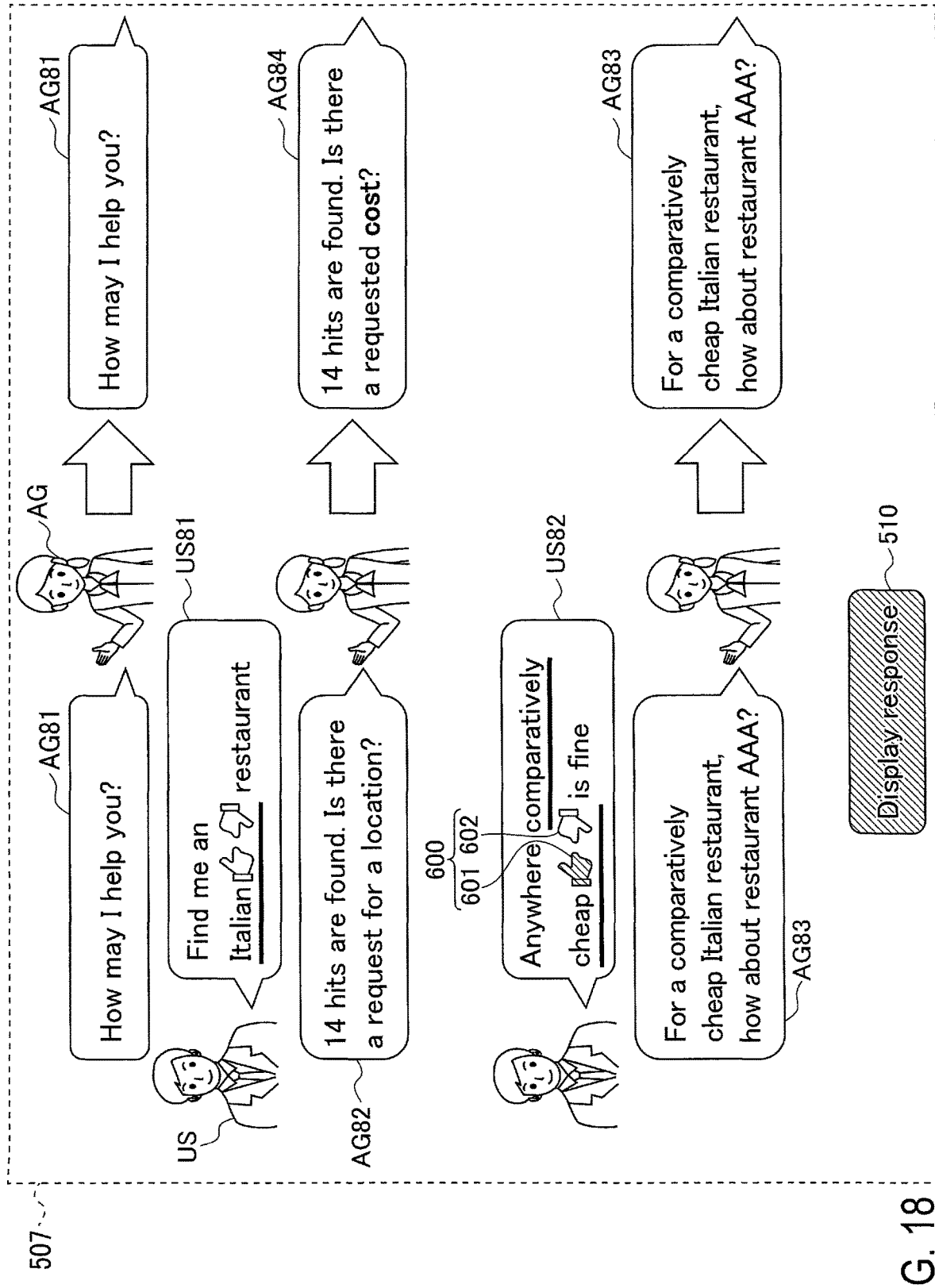
FIG. 18 shows an example of a display screen including a user interface provided by the interface-providing apparatus according to the fourth embodiment.

FIG. 18 shows a specific operation example of the interface-providing apparatus 400 according to the fourth embodiment. A display screen 507 shown in FIG. 18 includes a dialogue log between a dialogue system AG providing restaurant guidance and a user US (AG81 to AG83 and US81 to US82).

In this example, "Italian" in the user speech sentence US81 and "comparatively cheap" in US82 are identified as keywords, and a feedback input interface 600 is displayed in association with each keyword. In the feedbacks, a "Like!" button 601 associated with the keyword "comparatively cheap" in US82 is clicked. That is, a feedback that the keyword "comparatively cheap" is useful is input. Subsequently, in response to the display response button 510 being pressed, confirmation response sentences AG81, AG83, and AG84 are displayed on the right side of the display screen 507.

In FIG. 18, before the feedback is input, the system response sentence AG82 asks about a "location" by asking "Is there a request for a location?", which is immediately before the user speech sentence US82 "Anywhere comparatively cheap is fine". However, after the feedback is reflected, an inquiry on the "cost" is presented in the system response sentence AG84. Therefore, in the interface-providing apparatus 400 according to the fourth embodiment, by performing a feedback with respect to a keyword, the degree of usefulness of a slot of the keyword is adjusted. In this example, when the display response button 510 is pressed, all of the displayed system response sentences are regenerated under the same condition. However, since response sentences AG81 and AG83 were not influenced by the updated degree of usefulness, the same contents as the response sentences AG81 and AG83 before the feedback input are displayed.

In the operation example of FIG. 18, a feedback is performed with respect to a keyword. However, as in the third embodiment, the feedback may be performed with respect to a search result or the dialogue itself, and the degree of usefulness of slot may be updated from such feedback. Furthermore, a feedback may also be made on the slot name itself included in the user speech sentence or the system response sentence. In this case, the keyword identifying unit 102 identifies the slot name in the user speech sentence or the system response sentence, and the interface generating unit 103 generates display information for displaying the feedback input interface with respect to the slot name identified by the keyword identifying unit 102.

(4-3) Effect

Therefore, in the interface-providing apparatus 400 according to the fourth embodiment, when a feedback input is received for a keyword or a search result, etc. via the feedback input interface, the degree of usefulness of the slot of the keyword is updated. This allows the system manager, etc. to adjust the slot to be included as an exemplification word in the inquiry sentence from the system.

According to at least one of the interface-providing apparatuses of the above-described embodiments, a feedback input interface that is capable of receiving feedback input relating to the degree of usefulness of a keyword in interactions between the user and the system is provided. Since the degree of usefulness can be adjusted in units of keywords based on a feedback that is input via the feedback input, a more appropriate inquiry can be made from the system with respect to a user's speech.

Other Embodiments

It should be noted that the present invention is not limited to the above-described embodiments. For example, each function unit included in the interface-providing apparatuses 100, 200, 300, and 400 according to the embodiments may be distributed and arranged in a plurality of devices so that the processing is performed by these devices in liaison with each other. As an example, each of the degree of usefulness storage units 106 and 403, the input device 1005, and the output device 1006 may be provided integrally with the interface-providing apparatuses 100, 200, 300, and 400, or may be provided on other apparatuses that can be accessed through a network.

Furthermore, each of the processing function units may be realized by using circuits. The circuits may be specifically designed to realize specific functions, or may be a general-purpose circuit such as a processor.

Furthermore, each flow of processing explained above is not limited to the procedural steps explained above. Therefore, the order of some of the steps may be interchanged, or some of the steps may be implemented simultaneously in parallel. Furthermore, a series of processing explained above does not need to be executed successively in terms of time, and each step may be executed at any timing.

Furthermore, the above embodiments may be used in combination. For example, the data indicating degree of usefulness of keyword and the data indicating degree of usefulness of slot may be used in combination. Furthermore, concepts of the global degree of usefulness or the local degree of usefulness may be combined. Furthermore, the feedback input interface for a general user and the feedback input interface for a management user may be generated in parallel and output respectively to separate display devices.

The methods described above may be stored on a recording medium (storage medium), such as a magnetic disk (floppy (registered trademark) disk, hard disk, etc.), an optical disk (CD-ROM, DVD, MO, etc.), and a semiconductor memory (ROM, RAM, flash memory, etc.) as a program (software means) that can be executed by a calculator (a computer), or can be transmitted and distributed by a communication medium. It should be noted that the program to be stored on the medium side includes a setting program to configure software means (including not only an execution program but also a table and a table structure) to be executed by the calculator in the calculator. The calculator realizing the above-described apparatus executes the above-mentioned processing by reading a program recorded on a recording medium, constructing a software means by the setting program in certain circumstances, and controlling an operation by this software means. It should be noted that the recording medium according to the present specification is not limited to being used for distribution, and includes a storage medium, such as a magnetic disk or a semiconductor memory, provided inside the calculator or on devices connected via a network.

The starting condition and the ending condition, etc. of each step of each flow may be implemented by applying various modifications in a scope that would not depart from the gist of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An interface-providing apparatus comprising:
   circuitry configured to
      generate display information for displaying a graphical user interface (GUI), the GUI including dialogue data associated with a dialogue between a virtual agent and a user, the dialogue data including a question text requesting information and a response text replying to the question text,
      identify a keyword from the dialogue data that is included in the GUI,
      receive, via an input to a graphical indicator that is included in the GUI, feedback input relating to a degree of usefulness of the keyword when searching for the information, and
      calculate the degree of usefulness based on the feedback input that is input via the graphical indicator included in the GUI, and generate or update data indicating degree of usefulness which correlates the calculated degree of usefulness with the keyword or a name expressing an attribute of the keyword,
      wherein, in a case where the feedback input, which is input via the graphical indicator included in the GUI, is performed in relation to a degree of usefulness of a keyword included in a response text that was able to reduce a number of search targets to a number equal to or lower than a specific ratio or a specific value before and after the response text, the circuitry is configured to generate or update the data indicating degree of usefulness by assigning weights to the value of the degree of usefulness.

2. The apparatus according to claim 1,
   the circuitry is configured to generate a response text for narrowing down a search target of the information by referring to the data indicating degree of usefulness and using a keyword or the name expressing the attribute thereof with higher degree of usefulness as an exemplification word.

3. The apparatus according to claim 2, wherein the circuitry generates the response text as an inquiry to the question text in the dialogue data or to a newly input question text.

4. The apparatus according to claim 2, wherein the circuitry
- further correlates the degree of usefulness with a condition of interaction, under which each keyword is used, in the data indicating degree of usefulness, and
- determines a condition of interaction relating to a question text, which is immediately before the response text and a response target of the response text, and generates the response text by using a keyword corresponding to the determined condition or a name expressing an attribute thereof, whichever has a higher degree of usefulness, as the exemplification word.

5. The apparatus according to claim 2, wherein the circuitry generates the response text by using a keyword or a name expressing the attribute thereof in which a value of the degree of usefulness is equal to or higher than a specific threshold value, or a specific number of keywords or names expressing the attribute thereof which are extracted in an order of having a higher value of the degree of usefulness, as the exemplification word.

6. The apparatus according to claim 2, wherein in a case where the feedback input is performed in relation to a degree of usefulness of a keyword included in the question text but not included in the response text in the dialogue data, the circuitry generates or updates the data indicating degree of usefulness by assigning weights to the value of the degree of usefulness.

7. The apparatus according to claim 2, wherein, in a case where the feedback input is performed in relation to a degree of usefulness of a keyword included in a response text that was able to reduce the number of search targets to a number equal to or lower than a specific ratio or a specific value before and after the response text after a process of narrowing down the search target was stagnant for at least a specific number of times, the circuitry generates or updates the data indicating degree of usefulness by assigning weights to the value of the degree of usefulness.

8. The apparatus according to claim 1, wherein the circuitry generates display information for displaying the user interface in association with each keyword or a search result of the information together with the dialogue data.

9. The apparatus according to claim 1, wherein the circuitry generates the display information so that the feedback input relating to a degree of usefulness of the keyword is received in a binary manner, expressing whether or not the keyword is useful, or a multivalued manner, expressing a degree in which the keyword is useful.

10. The apparatus according to claim 1, wherein the circuitry identifies the keyword using a rule-based method or a statistics-based method.

11. The apparatus according to claim 2, wherein the circuitry generates the response text in response to the data indicating degree of usefulness being generated or updated, or a new question text being input.

12. An interface-providing method comprising:
- generating display information for displaying a graphical user interface (GUI), the GUI including dialogue data associated with a dialogue between a virtual agent and a user, the dialogue data including a question text requesting information and a response text replying to the question text;
- identifying a keyword from the dialogue data that is included in the GUI;
- receiving, via an input to a graphical indicator that is included in the GUI, feedback input relating to a degree of usefulness of the keyword when searching for the information; and
- calculating the degree of usefulness based on the feedback input that is input via the graphical indicator included in the GUI, and generating or updating data indicating degree of usefulness which correlates the calculated degree of usefulness with the keyword or a name expressing an attribute of the keyword,
- wherein, in a case where the feedback input, which is input via the graphical indicator included in the GUI, is performed in relation to a degree of usefulness of a keyword included in a response text that was able to reduce a number of search targets to a number equal to or lower than a specific ratio or a specific value before and after the response text, the generating or updating generates or updates the data indicating degree of usefulness by assigning weights to the value of the degree of usefulness.

13. A non-transitory computer readable medium including computer executable instructions, wherein the instructions, when executed by a processor, cause the processor to perform a method comprising:
- generating display information for displaying a graphical user interface (GUI), the GUI including dialogue data associated with a dialogue between a virtual agent and a user, the dialogue data including a question text requesting information and a response text replying to the question text;
- identifying a keyword from the dialogue data that is included in the GUI;
- receiving, via an input to a graphical indicator that is included in the GUI, feedback input relating to a degree of usefulness of the keyword when searching for the information; and
- calculating the degree of usefulness based on the feedback input that is input via the graphical indicator included in the GUI, and generating or updating data indicating degree of usefulness which correlates the calculated degree of usefulness with the keyword or a name expressing an attribute of the keyword,
- wherein, in a case where the feedback input, which is input via the graphical indicator included in the GUI, is performed in relation to a degree of usefulness of a keyword included in a response text that was able to reduce a number of search targets to a number equal to or lower than a specific ratio or a specific value before and after the response text, the generating or updating generates or updates the data indicating degree of usefulness by assigning weights to the value of the degree of usefulness.

\* \* \* \* \*